United States Patent
Maigne et al.

(10) Patent No.: US 9,619,279 B2
(45) Date of Patent: *Apr. 11, 2017

(54) OPERATING SYSTEMS SHARING SUPERVISOR ADDRESS SPACE WITH SAME VIRTUAL TO PHYSICAL MAPPING FOR SUPERVISOR ADDRESS SPACE USING SAME TRANSLATION FORMULA WITH DIFFERENT TRANSLATION TREE

(75) Inventors: Gilles Maigne, Guyancourt (FR);
Guennadi Maslov, Rueil Malmaison (FR)

(73) Assignee: RED BEND SOFTWARE SAS, Montigny le Bretonneux (FR)

( * ) Notice: Subject to any disclaimer, the term of this patent is extended or adjusted under 35 U.S.C. 154(b) by 1010 days.

This patent is subject to a terminal disclaimer.

(21) Appl. No.: 11/660,363

(22) PCT Filed: Aug. 18, 2005

(86) PCT No.: PCT/EP2005/008968
§ 371 (c)(1),
(2), (4) Date: Jul. 6, 2007

(87) PCT Pub. No.: WO2006/018307
PCT Pub. Date: Feb. 23, 2006

(65) Prior Publication Data
US 2008/0155542 A1 Jun. 26, 2008

(30) Foreign Application Priority Data
Aug. 18, 2004 (EP) ..................................... 04292063

(51) Int. Cl.
*G06F 9/455* (2006.01)
*G06F 9/48* (2006.01)

(52) U.S. Cl.
CPC .......... *G06F 9/4843* (2013.01); *G06F 9/4555* (2013.01); *G06F 9/45533* (2013.01); *G06F 2212/7201* (2013.01)

(58) Field of Classification Search
CPC .. G06F 9/4555; G06F 9/4843; G06F 9/45533; G06F 2212/7201
See application file for complete search history.

(56) References Cited

U.S. PATENT DOCUMENTS 5,179,691 A * 1/1993 O'Brien et al. ................ 703/23
5,995,745 A * 11/1999 Yodaiken ........................ 703/26
(Continued)

FOREIGN PATENT DOCUMENTS

EP 1 031 924 8/2000
EP 1 162 536 12/2001

OTHER PUBLICATIONS

ChorusOS 5.0 Features and Architecture Overview; Sun Microsystem 2001; 224 pages.*
(Continued)

*Primary Examiner* — Abdullah Al Kawsar
(74) *Attorney, Agent, or Firm* — Nixon & Vanderhye P.C.

(57) ABSTRACT

A method of enabling multiple different operating systems to run concurrently on the same RISC (e.g. ARM) computer, comprising selecting a first operating system to have a relatively high priority (the realtime operating system, such as C5); selecting at least one secondary operating system to have a relatively lower priority (the general purpose operating system, such as Linux); providing a common program (a hardware resource dispatcher similar to a nanokernel) arranged to switch between said operating systems under predetermined conditions; and providing modifications to said first and second operating systems to allow them to be controlled by said common program.

24 Claims, 11 Drawing Sheets

(56) References Cited

U.S. PATENT DOCUMENTS

| | | | |
|---|---|---|---|
| 6,075,938 A * | 6/2000 | Bugnion et al. | 703/27 |
| 6,615,303 B1 * | 9/2003 | Endo et al. | 710/260 |
| 6,715,016 B1 * | 3/2004 | Ohno et al. | 710/260 |
| 7,661,104 B2 * | 2/2010 | Watt et al. | 718/100 |
| 2001/0016879 A1 | 8/2001 | Sekiguchi et al. | |
| 2003/0036843 A1 * | 2/2003 | Okude et al. | 701/200 |
| 2003/0037089 A1 * | 2/2003 | Cota-Robles et al. | 709/1 |
| 2003/0037178 A1 * | 2/2003 | Vessey et al. | 709/319 |
| 2004/0039944 A1 * | 2/2004 | Karasaki | 713/201 |
| 2004/0153672 A1 * | 8/2004 | Watt | G06F 9/3012 726/22 |
| 2004/0158831 A1 * | 8/2004 | Amano et al. | 718/100 |
| 2004/0237086 A1 * | 11/2004 | Sekiguchi et al. | 718/100 |
| 2006/0112212 A1 * | 5/2006 | Hildner | G06F 9/45537 711/6 |

OTHER PUBLICATIONS

International Search Report for PCT/EP2005/008968 mailed Aug. 4, 2006.

European Search Report dated Jun. 24, 2013 issued in corresponding EP Application No. 10186065.8-1957.

XP-001189063, Jaluna-2 Preview Release 1 Description, Jaluna Product Documentation, Dec. 2002, 30 pages.

European Search Report dated May 30, 2012 issued in corresponding EP Application No. 10186065.8-1243.

* cited by examiner

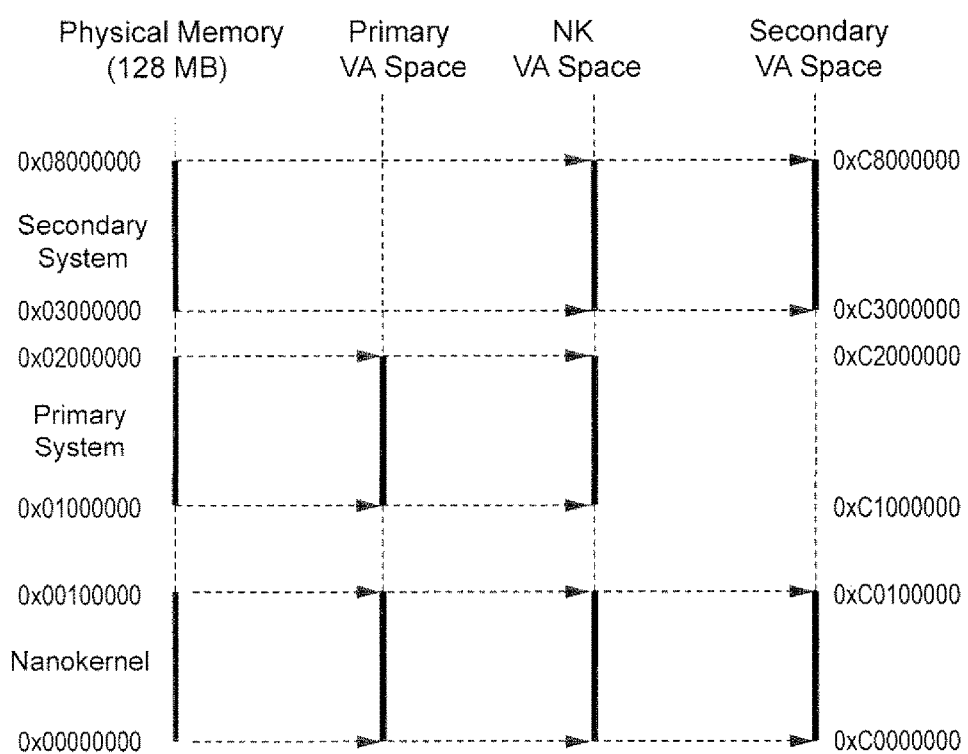
Figure 10  Virtual Address Spaces

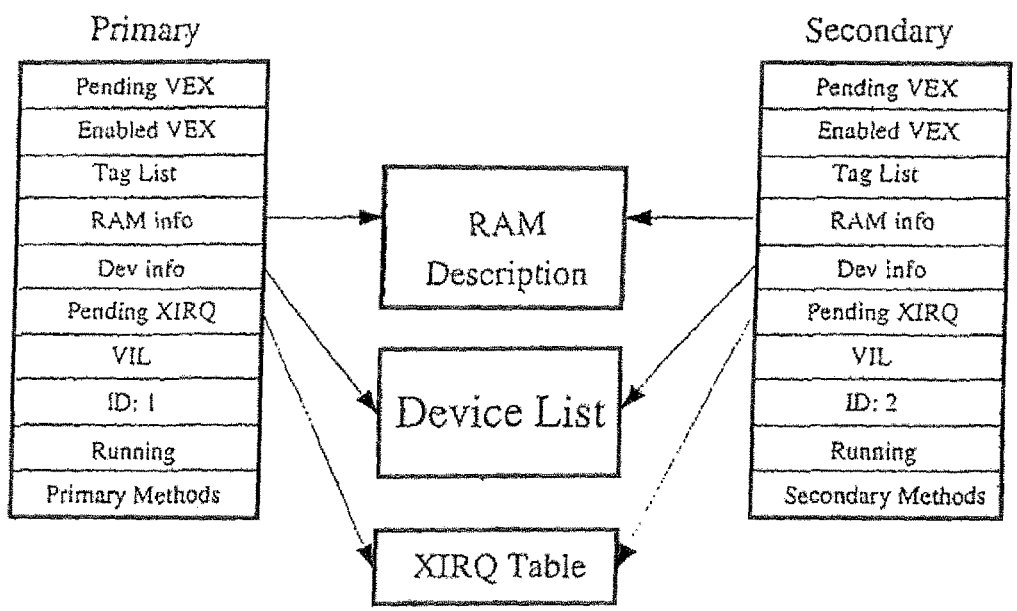
Figure 11 Visible Kernel Context

OPERATING SYSTEMS SHARING SUPERVISOR ADDRESS SPACE WITH SAME VIRTUAL TO PHYSICAL MAPPING FOR SUPERVISOR ADDRESS SPACE USING SAME TRANSLATION FORMULA WITH DIFFERENT TRANSLATION TREE

This application is the US national phase of international application PCT/EP2005/008968 filed 18 Aug. 2005, which designated the U.S. and claims benefit of EP 04292063.7 filed 18 Aug. 2004, now abandoned, the entire contents of each of which are hereby incorporated by reference.

This invention relates to operating systems. More particularly, this invention relates to systems, methods and computer programs for running multiple operating systems concurrently.

For some computer programs, it is critical that steps in the program are performed within defined time periods, or at defined times. Examples of such programs are control programs for operating mobile telephones, or for operating private branch exchanges (PBXs) or cellular base stations. Typically, the program must respond to external events or changes of state in a consistent way, at or within a certain time after the event. This is referred to as operating in "real time".

For many other programs, however, the time taken to execute the program is not critical. This applies to most common computer programs, including spreadsheet program, word processing programs, payroll packages, and general reporting or analysis programs. On the other hand, whilst the exact time taken by such programs is not critical, in most cases, users would prefer quicker execution where this is possible.

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several program to operate concurrently. To do so, they provide scheduling; in other words, they share the usage of the resources of the computer between the different programs, allocating time to each in accordance with a scheduling algorithm. Operating systems of the this kind are very widely used, but they generally make no provision for running real time applications, and they therefore are unsuitable for many control or communications tasks.

For such tasks, therefore, real time operating systems have been developed; one example is ChorusOS (also know as Chorus) and its derivatives.

It is described in "ChorusOS Features and Architecture overview" Francois Armand, Sun Technical Report, August 2001, 222p.

These operating systems could also be used to run other types of programs. However, users understandably wish to be able to run the vast number of "legacy" programs which are written for general purpose operating systems such as Windows or Linux, without having to rewrite them to run on a real time operating system.

It would be possible to provide a "dual boot" system, allowing the user to run either one operating system or the other, but there are many cases where it would be desirable to be able to run a "legacy" program at the same time as running a real time program. For example, telecommunications network infrastructure equipment, third generation mobile phones and other advanced phones, and advanced electronic gaming equipment may require both realtime applications (e.g. game playing graphics) and non-realtime applications (game download).

In U.S. Pat. No. 5,903,752 and U.S. Pat. No. 5,721,922, an attempt is made to incorporate a real time environment into a non real time operating system by providing a real time multi-tasking kernel in the interrupt handling environment of the non real time operating system (such as Windows).

One approach which has been widely used is "emulation". Typically, an emulator program is written, to run under the real time operating system, which interprets each instruction of a program written for a general purpose operating system, and performs a corresponding series of instructions under the real time operating system. However, since one instruction is always replaced by many, emulation places a heavier load on the computer, and results in slower performance. Similar problems arise from the approach based on providing a virtual machine (e.g. a Java™ virtual machine). Examples of virtual machine implementations are EP 1059582, U.S. Pat. No. 5,499,379, and U.S. Pat. No. 4,764,864.

A further similar technique is described in U.S. Pat. No. 5,995,745 (Yodaiken). Yodaiken describes a system in which a multi tasking real time operating system runs a general purpose operating system as one of its tasks, pre-empting it as necessary to perform real time tasks.

Another approach is to run the realtime operating system as a module of the general purpose operating system, as described in for example EP 0360135 and the article "Merging real-time processing and UNIX V", (Gosch), ELECTRONICS, September 1990 p 62. In this case, hardware interrupts are selectively masked with the intention that those concerned with the general purpose operating system should not pre-empt the realtime operating system.

Another approach is that of ADEOS (Adaptive Domain Environment for Operating Systems).

ADEOS provides a nanokernel which is intended, amongst other things, for running multiple operating systems although it appears only to have been implemented with Linux. One proposed use of ADEOS was to allow ADEOS to distribute interrupts to RTAI (Realtime Application Interface for Linux).

EP 1054332 describes a system in which a "switching unit" (which is not described in sufficient detail for full understanding) runs a realtime and a general purpose operating system. Hardware interrupts are handled by a common interrupt handler, and in some embodiments, they are handled by the realtime operating system, which then generates software interrupts at a lower priority level which are handled by routines in the secondary operating system.

An object of the present invention is to provide an improved system, method and computer program for running multiple operating systems simultaneously, even when the systems are designed for different purposes. In particular, the present invention aims to allow one of the operating systems (for example, a real time operating systems) to perform without disturbance, and the other (for example, a general purpose operating system) to perform as well as possible using the remaining resources of the computer. More particularly, the present invention is intended to provide such a system usable with a Reduced Instruction Set Computer (RISC) such as those using the ARM processor Accordingly, aspects of the invention are defined in the claims. The present description incorporates by reference our earlier-filed European applications EP03290894.9 filed 9 Apr. 2003, PCT/EP04/003731 filed at the EPO on 7 Apr. 2004, and EP03292428.4 filed 1 Oct. 2003.

One particular issue for many architectures based on the ARM processor is that the cache memory unit uses virtual addressing mode. When multiple operating systems are run, each in its own memory space, each uses a different mapping of virtual memory to physical memory addresses. This would result in erroneous data being retrieved from the cache after a switch to another operating system. One way of resolving this would be to flush the contents of the cache memory on each operating system switch. However, we have realised that for realtime applications this is undesirable because firstly it increases the delay in switching and secondly it slows the memory access of initially after flushing the cache. Accordingly, in one aspect of the invention, we force the operating systems to all use the same kernel virtual mapping.

Another issue is that the ARM processor has a number of additional execution modes (5 or 6, as opposed to the commonplace "user" and "supervisor" modes found on most processors). Changing between operating systems might therefore involve additionally changing between execution modes. To allow for this would involve saving (e.g. to a stack) the state of all registers on each switch between operating systems. That would slow down such switches. Accordingly, in one aspect of the invention, we require all operating systems to use the registers concerned (registers 13 to 15 for example) in "scratch" mode, so that they do not care about how they are found or left. Our observation is that many do so anyway; in other cases it might be necessary to rewrite portions of the operating system. Then the operating system switches back to "supervisor" mode, so that all transfers to the nanokernel (and hence to other operating systems) take place from supervisor mode only. Thus, when an operating system switches to another (for example, by invoking an idle task when it has finished operating) it does not need to save these register states.

We provide in one aspect of the invention that when in higher modes, an operating system cannot be pre-empted— we have found that operating systems typically use such modes only for very short segments of code.

Other aspects, embodiments and preferred features, with corresponding advantages, will be apparent from the following description, claims and drawings.

BRIEF DESCRIPTION OF DRAWINGS

Embodiments of the invention will now be described, by way of example only, with reference to the accompanying drawings, in which:

FIG. 10 illustrates the memory mappings used by the operating systems; and

FIG. 11 illustrates the interface between the nanokernel and the operating systems.

DETAILED DESCRIPTION

Figure 1:
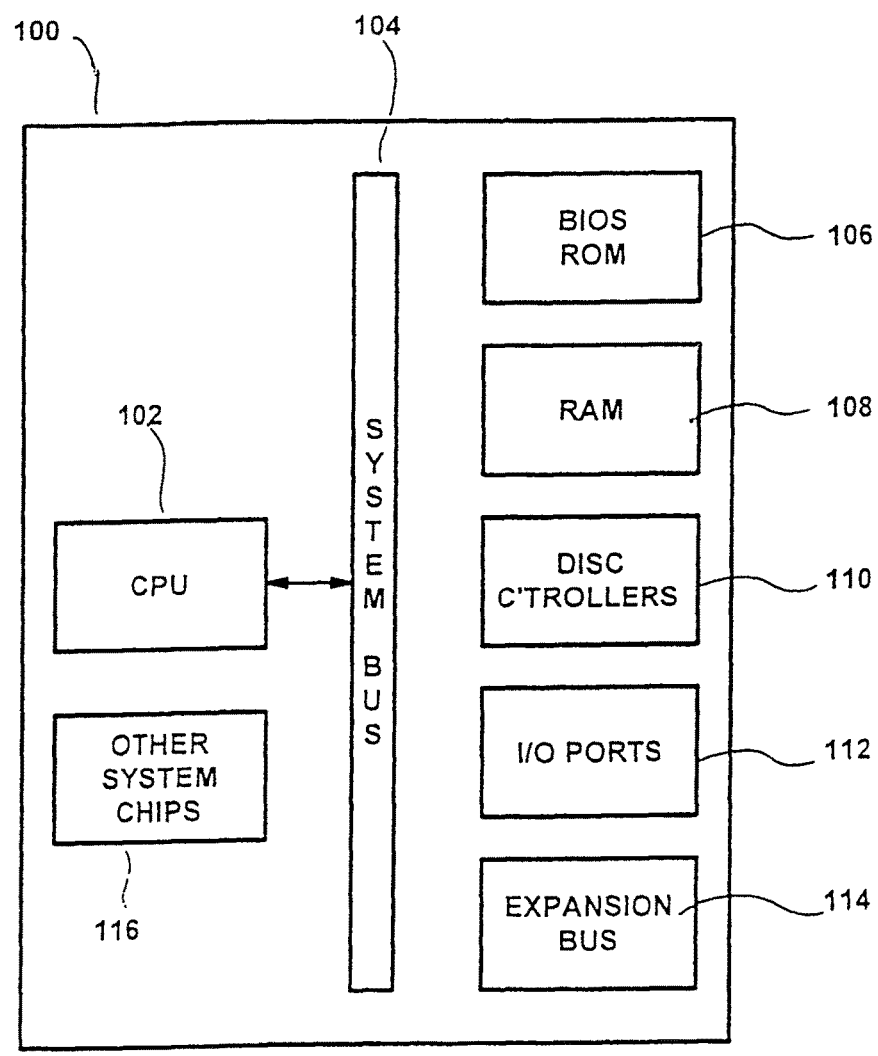
FIG. 1 is a block diagram showing the elements of a computer system on which the present invention can execute.

Introduction
System Hardware

A computer system to which the system is applicable 100 comprises a central processing unit (CPU) 102, such as an ARM processor available from ARM Ltd and as described in the technical manuals and datasheets coupled via a system bus 104 (comprising control, data and address buses) to a read-only memory (ROM) chip 106; one or more banks of random access memory (RAM) chips (108); disk controller devices 110 (for example IDE (Integrated Device Electronics) or SCSI (Small Computer System Interface) controllers, connected to a floppy disk drive, a hard disk drive, and additional removable media drives such as DVD (Digital Versatile Disk) drives); one or more input/output ports (112) (for example, one or more USB Universal Serial Bus) port controllers, and/or parallel port controllers for connection to printer and so on); an expansion bus 114 for bus connection to external or internal peripheral devices (for example the PCI (Peripheral Component Interconnect) bus); and other system chips 116 (for example, graphics and sound devices). Examples of computers of this type are personal computers (PCs) and workstations. However, the application of the invention to other computing devices such as mainframes, embedded microcomputers in control systems, and PDAs Personal Digital Assistants) (in which case some of the indicated devices such as disk drive controllers may be absent) is also disclosed herein.

Management of Software

Figure 2A:
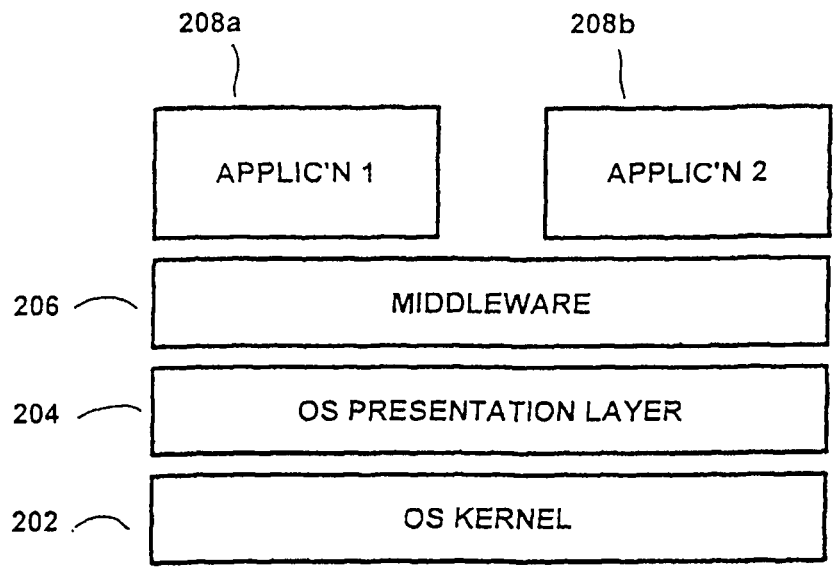
FIG. 2a is a diagram illustrating the arrangement of software in the prior art.

Referring to FIG. 2a, in use, the computer 100 of FIG. 1 runs resident programs comprising operating system kernel 202 (which provides the output routines allowing access by the CPU to the other devices shown in FIG. 1); an operating system user interface or presentation layer 204 (such as X Windows); a middleware layer 206 (providing networking software and protocols such as, for instance, a TCP/IP (Transmission Control Protocol/Internet Protocol) stack) and applications 208a, 208b, which run by making calls to the API (Application Programming Interface) routines forming the operating system kernel 202.

The operating system kernel has a number of tasks, in particular:
  scheduling (i.e., sharing the CPU and associated resources between different applications which are running);
  a memory management (i.e. allocating memory to each task, and, where necessary, swapping data and programs out of memory add on to disk drives);
  providing a file system;
  providing access to devices (typically, through drivers);
  interrupt handling;

a providing an applications programming interface enabling the applications to interact with system resources and users.

The kernel may be a so-called "monolithic kernel" as for Unix, in which case the device drivers form part of the kernel itself. Alternatively, it may be a "microkernel" as for Chorus, in which case the device drivers are separate of the kernel.

In use, then, when the computer 100 is started, a bootstrap program stored in ROM 106 accesses the disk controllers 110 to read the file handling part of the operating system from permanent storage on disk into RAM 108, then loads the remainder of the operating system into an area of RAM 108. The operating system then reads any applications from the disk drives via the disk controllers 110, allocates space in RAM 108 for each, and stores each application in its allocated memory space.

During operation of the applications, the scheduler part of the operating system divides the use of the CPU between the different applications, allowing each a share of the time on the processor according to a scheduling policy. It also manages use of the memory resources, by "swapping out" infrequently used applications or data (i.e. removing them from RAM 108 to free up space, and storing them on disk).

Finally the routines making up the applications programming interface (API) are called from the applications, to execute functions such as input and output, and the interrupt handling routines of the operating system respond to interrupt and events.

SUMMARY OF PRINCIPLES OF THE PREFERRED EMBODIMENT

In the preferred embodiment, each operating system 201, 202 to be used on the computer 100 is slightly re-written, and a new low-level program 400 (termed here the "hardware resource dispatcher", and sometimes known as a "nanokernel" although it is not the kernel of an operating system) is created. The hardware resource dispatcher 400 is specific to the particular type of CPU 102, since it interacts with the processor. The versions of the operating systems which are modified 201, 202 are also those which are specific to the hardware, for reasons which will become apparent.

The hardware resource dispatcher 400 is not itself an operating system. It does not interact with the applications programs at all, and has very limited functionality. Nor is it a virtual machine or emulator; it requires the operating systems to be modified in order to cooperate, even though it leaves most of the processing to the operating systems themselves, running their native code on the processor.

It performs the following basic functions:
a loading and starting each of the multiple operating systems;
a allocating memory and other system resources to each of the operating systems;
scheduling the operation of the different operating systems (i.e. dividing CPU time between them, and managing the change over between them);
a providing a "virtualised device" method of indirect access to those system devices which need to be shared by the operating systems ("virtualising" the devices);
providing a communications link between the operating systems, to allow applications running on different operating systems to communicate with each other.

The operating systems are not treated equally by the embodiment. Instead, one of the operating systems is selected as the "critical" operating systems (this will be the real time operating system), and the or each other operating system is treated as a "non critical" or "secondary" operating systems (this will be the or each general purpose operating system such as Linux).

When the hardware resource dispatcher is designed, it is provided with a data structure (e.g. a table) listing the available system resources (i.e. devices and memory), to enable as many system devices as possible to be statically allocated exclusively to one or other of the operating systems.

For example, a parallel printer port might be statically allocated to the general purpose operating system 202, which will often run applications which will need to produce printer output. On the other hand, an ISDN (Integrated Services Digital Network digital line adapter port may be permanently allocated to the real time operating system 201 for communications. This static allocation of devices wherever possible means that each operating system can use its existing drivers to access statically allocated devices without needing to call the hardware resource dispatcher. Thus, there is no loss in execution speed in accessing such devices (as there would be if it acted as a virtual machine or emulator).

In the case of system devices which must be shared, the hardware resource dispatcher virtualises uses of the devices by the non-critical operating systems, and makes use of the drivers supplied with the critical operating system to perform the access. Likewise, for interrupt handling, the interrupts pass to the critical operating system interrupt handling routines, which either deal with the interrupt (if it was intended for the critical operating system) or pass it back through the hardware resource dispatcher for forwarding to a non critical operating system (if that was where it was destined).

On boot, the hardware resource dispatcher is first loaded, and it then loads each of the operating systems in a predetermined sequence, starting with the critical operating system, then following with the or each secondary operating system in turn. The critical operating system is allocated the resources it requires from the table, and has a fixed memory space to operate in. Then each secondary operating system in turn is allocated the resources and memory space it requires from the available remaining resources.

Thus, according to the embodiment, the resources used by the operating systems are separated as much as physically possible, by allocating each its own memory space, and by providing a static allocation of devices exclusively to the operating systems; only devices for which sharing is essential are shared.

In operation, the hardware resource dispatcher scheduler allows the critical operating system to operate until it has concluded its tasks, and then passes control back to each non critical operating system in turn, until the next interrupt or event occurs.

The embodiment thus allows a multi operating system environment in which the operation of the critical operating system is virtually unchanged (since it uses its original drivers, and has first access to any interrupt and event handling). The secondary operating systems are able to operate efficiently, within the remaining processor time, since in most cases they will be using their own native drivers, and will have exclusive access to many of the system devices. Finally, the hardware resource dispatcher itself can be a small program, since it handles only limited functions, so that system resources are conserved.

The preferred embodiment is also economic to create and maintain, because it involves only limited changes to standard commercial operating systems which will already have been adapted to the particular computer 100. Further, since the changes to the operating systems are confined to architecture specific files handling matters such as interrupt handling, and configuration at initialising time, which interface with the particular type of computer 100, and which are unlikely to change as frequently as the rest of the operating system, there may be little or no work to do in adapting new versions of the same operating system to work in a multiple operating system fashion.

DETAILED DESCRIPTION OF THE PREFERRED EMBODIMENT

In this embodiment, the computer 100 was an Intel 386 family processor (e.g. a Pentium processor) and a Motorola PowerPC 750 (Reduced Instruction Set Computer or "RISC") computer (step 302). The critical operating system 201 was the C5 operating system (the real time microkernel of Jaluna-1, an open-source version of the fifth generation of the ChorusOS system.

In step 306, the ChorusOS operating system kernel 201 is modified for operating in multiple operating system mode, which is treated in the same way as porting to a new platform (i.e. writing a new Board Support Package to allow execution on a new computer with the same CPU but different system devices). The booting and initialisation sequences are modified to allow the real time operating system to be started by the hardware resource dispatcher, in its allocated memory space, rather than starting itself. The hardware-probing stage of the initialisation sequence is modified, to prevent the critical operating system from accessing the hardware resources which are assigned to other secondary systems. It reads the static hardware allocation table from the hardware resource dispatcher to detect the devices available to it.

Trap calls are added to the critical operating system, to detect states and request some actions in response. A trap call here means a call which causes the processor to save the current context (e.g. state of registers) and load a new context. Thus, where virtual memory addressing is used, the address pointers are changed.

For example, when the real time operating system 201 reaches an end point (and ceases to require processor resources) control can be passed back to the hardware resource dispatcher, issuing the "idle" trap call, to start the secondary operating system. Many processors have a "halt" instruction. In some cases, only supervisor-level code (e.g. operating systems, not applications) can include such a "halt" instruction. In this embodiment, all the operating systems are rewritten to remove "halt" instructions and replace them with an "idle" routine (e.g. an execution thread) which, when called, issues the "idle" trap call.

Some drivers of the Board Support Package are specially adapted to assist the hardware resource dispatcher in virtualizing the shared devices for secondary operating systems.

Additional "virtual" drivers are added which, to the operating system, appear to provide access to an input/output (I/O) bus, allowing data to be written to the bus. In fact, the virtual bus driver uses memory as a communications medium; it exports some private memory (for input data) and imports memory exported by other systems (for output data). In this way, the operating system 201 (or an application running on the operating system) can pass data to another operating system (or application running on it) as if they were two operating systems running on separate machines connected by a real I/O bus.

The secondary operating system 202 was selected (step 308) as Linux, having a kernel version 2.4.18 (step 308).

In step 310, the secondary operating system kernel 202 is modified to allow it to function in a multiple operating system environment, which is treated as a new hardware architecture. As in step 306, the boot and initialisation sequences are modified, to allow the secondary operating system to be started by the hardware resource dispatcher, and to prevent it from accessing the hardware resources assigned to the other systems, as specified in the hardware resource dispatcher table. As in step 306, trap calls are added, to pass control to the hardware resource dispatcher.

Native drivers for shared system devices are replaced by new drivers dealing with devices which have been virtualized by the hardware resource dispatcher (interrupt controller, I/O bus bridges, the system timer and the real time clock). These drivers execute a call to virtual device handlers 416 of the hardware resource dispatcher in order to perform some operations on a respective device of the computer 100. Each such virtual device handler 416 of the hardware resource dispatcher is paired with a "peer" driver routine in the critical operating system, which is arranged to directly interact with the system device. Thus, a call to a virtual device handler is relayed up to a peer driver in the critical system for that virtualized device, in order to make real device access. As in step 306, read and write drivers 2021 for the virtual I/O bus are provided, to allow inter-operating system communications.

The interrupt service routines of the secondary operating system are modified, to provide virtual interrupt service routines each of which responds to a respective virtual interrupt (in the form of a call issued by an interrupt handler routine 412 of the hardware resource dispatcher), and not to respond to real interrupts or events. Routines of the secondary operating system (including interrupt service routines) are also modified to remove masking of hardware interrupts (at least in all except critical operations). In that way, the secondary operating systems 202, . . . are therefore pre-emptable by the critical operating system 201; in other words, the secondary operating system response to a virtual interrupt can itself be interrupted by a real interrupt for the critical operating system 201. This typically includes:
  a masking/unmasking events (interrupts at processor level);
  saving/restoring events mask status;
  identifying the interrupt source (interrupt controller devices);
  masking/unmasking interrupts at source level (interrupt controller devices).

New virtual device drivers are added, for accessing the shared hardware devices (the I/O bus bridges, the system console, the system timer and the real time clock). These drivers execute a call to virtual device handlers 416 of the hardware resource dispatcher in order to write data to, or read data from, a respective device of the computer 100.

To effect this, the Linux kernel is modified in this embodiment by adding new virtual hardware resource dispatcher architecture sub trees (nk-i386 and nk-ppc for the I-386 and PowerPC variants) with a small number of modified files. Unchanged files are reused in their existing form. The original sub-trees are retained, but not used.

Figure 4:
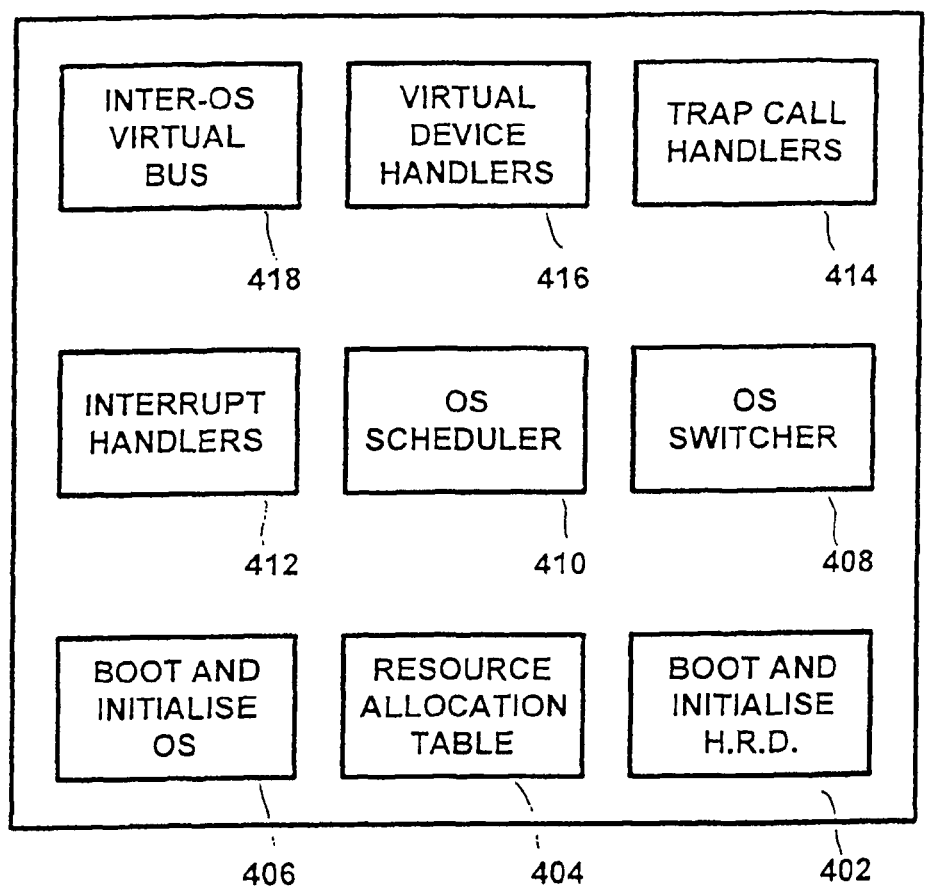
FIG. 4 show the components of a hardware resource dispatcher forming part of FIG. 2b.

In step 312, the hardware resource dispatcher is written. The hardware resource dispatcher comprises code which provides routines for the following functions (as shown in FIG. 4):

booting and initialising itself (402);

storing a table which stores a list of hardware resources (devices such as ports) and an allocation entry indicating to which operating system each resource is uniquely assigned;

booting and initialising the critical operating system that completes the hardware resource dispatcher allocation tables (404);

a booting and initialising secondary operating systems (406)

switching between operating systems (408);

scheduling between operating systems (410);

handling interrupts (using the real time operating system interrupt service routines, and supplying data where necessary to the virtual interrupt service routines of the secondary operating systems) (412);

handling trap calls from each of the operating systems (414);

handling access to shared devices from the secondary operating systems (416);

handling inter-operating system communications on the virtual I/O bus (418).

In further embodiments (described below), it may also provide a system debugging framework.

Operating System Switcher 408

In order to switch from an operating system to another, the operating system switcher 408 is arranged to save the "context"—the current values of the set of state variables, such as register values—of the currently executing operating system; restore the stored context of another operating system; and call that other operating system to recommence execution where it left off. Where the processor uses segments of memory, and virtual or indirect addressing techniques, the registers or data structures storing the pointers to the current memory spaces are thus swapped. For example, the operating systems each operate in different such memory spaces, defined by the context including the pointer values to those spaces.

In detail, the switcher provides:

explicit switches (e.g. trap calls) from the currently running to the next scheduled operating systems, when the current becomes idle; and implicit switches from a secondary operating system to the critical operating system, when a hardware interrupt occurs.

The switches may occur on a trap call or a real or virtual interrupt, as described below.

Scheduler 410

The scheduler 410 allocates each operating system some of the available processing time, by selecting which secondary operating system (if more than one is present) will be switched to next, after exiting another operating system. In this embodiment, each is selected based on fixed priority scheduling. Other embodiments allowing specification based on time sharing, or guaranteed minimum percentage of processor time, are also contemplated herein. In each case, however, the critical operating system is pre-empted only when in the idle state.

In further embodiments, the critical operating system may explicitly inform the scheduler 410 when it may be pre-empted, so as to allow all secondary operating systems some access to the CPU to perform tasks with higher priority then the tasks still running in critical system. Thus, in one example, the interrupt service routines of the critical operating system cannot be pre-empted, so that the critical operating system can always respond to external events or timing signals from the realtime clock, maintaining realtime operation.

Handling Virtualised Processor Exceptions

The hardware resource dispatcher is arranged to provide mechanisms to handle processor exceptions (e.g. CPU interrupts or co-processor interrupts) as follows:

firstly, to intercept processor exceptions through the critical operating system;

secondly, to post a corresponding virtual exception to one or more secondary operating systems; to store that data and, when the scheduler next calls that secondary operating system, to call the corresponding virtual interrupt service routine in the secondary operating system;

thirdly, to mask or unmask any pending virtual exceptions from within secondary operating systems.

Virtualised exceptions are typically used for two different purposes;

Firstly, to forward hardware device interrupts (which are delivered as asynchronous processor exceptions) to secondary operating systems;

Secondly, to implement inter-operating system cross-interrupts—i.e. interrupts generated by one system for another interrupts (which are delivered as synchronous exceptions).

Trap Call Handler 414

The operation of the trap call handler will become apparent from the following description. Its primary purpose is to allow the scheduler and switcher to change to another operating system when a first one halts (and hence does not require CPU resources). An additional role is to invoke hardware resource dispatcher services such as a system console for use in debugging as discussed in relation to later embodiments.

Virtualised Devices 416

As indicated above, for each shared device (e.g. interrupt controller, bus bridges, system timer, realtime clock) each operating system provides a device driver, forming a set of peer-level drivers for that device. The realtime operating system provides the driver used to actually access the device, and the others provide virtual device drivers.

The shared device handler 416 of the hardware resource dispatcher provides a stored data structure for each device, for access by all peer device drivers of that device. When the device is to be accessed, or has been accessed, the device drivers update the data stored in the corresponding data structure with the details of the access. The peer drivers use cross-interrupts (as discussed above) to signal an event to notify other peer drivers that that the data structure has just been updated.

The drivers which are for accessing interrupt controller devices use the virtualised exception mechanisms discussed above to handle hardware interrupts as follows:

The critical operating system device driver handles hardware interrupts and forwards them as virtualised exceptions to the secondary peer drivers;

The secondary operating system enables and disables interrupts by using the virtualised exception masking and unmasking routines discussed above.

I/O buses and their bridges only have to be shared if the devices connected to them are not all allocated to the same operating system. Thus, in allocating devices, to the extent possible, devices connected to the same I/O bus are allocated to the same operating system. Where sharing is necessary, the resource allocation table 404 stores descriptor data indicating the allocation of the resources on the bus (address spaces, interrupt lines and I/O ports) to indicate which operating system has which resources.

Implementation of the Embodiment

Finally, in step 314, the code for the hardware resource dispatcher and operating systems is compiled as a distributable binary computer program product for supply with the computer 100.

A product which may be supplied in accordance with an aspect of the invention is a development environment product, comprising a computer program which enables the user to select different operating systems to be used, build and select different applications for each operating system, embed the application and operating systems into a deliverable product, and provide for booting of the operating system and launch of executable binaries of the applications. This is based on, and similar to, the C5 development environment, available from www.jaluna.com.

Operation of the Embodiment During Booting and Initialisation

Figure 5:
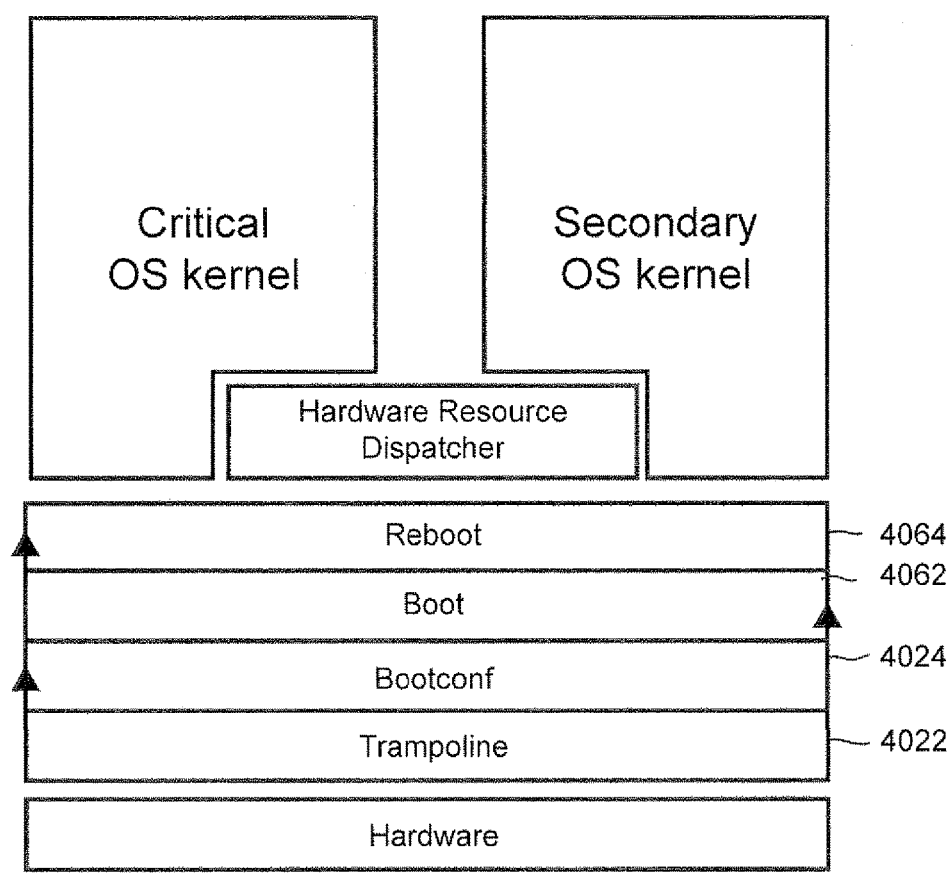
FIG. 5 illustrates the program used in a boot and initialisation sequence.

Referring to FIG. 5, the boot and initialisation processes according to this embodiment are performed as follows.

A bootstrapping program ("trampoline") 4022 stored in the ROM 106 is executed when power is first supplied, which starts a program 4024 which installs the rest of the hardware resource dispatcher program 400 into memory, and starts it, passing as an argument a data structure (as described below) describing the system image configuration.

The hardware resource dispatcher initialises a serial line which may be used for a system console. It then allocates memory space (an operating system environment) for each operating system in turn, starting with the critical operating system. The hardware resource dispatcher therefore acts as a second level system kernel boot loader.

Each operating system kernel then goes through its own initialisation phase, selecting the resources to be exclusive to that operating system within those remaining in the resource allocation table 404, and starting its initial services and applications.

Figure 6:
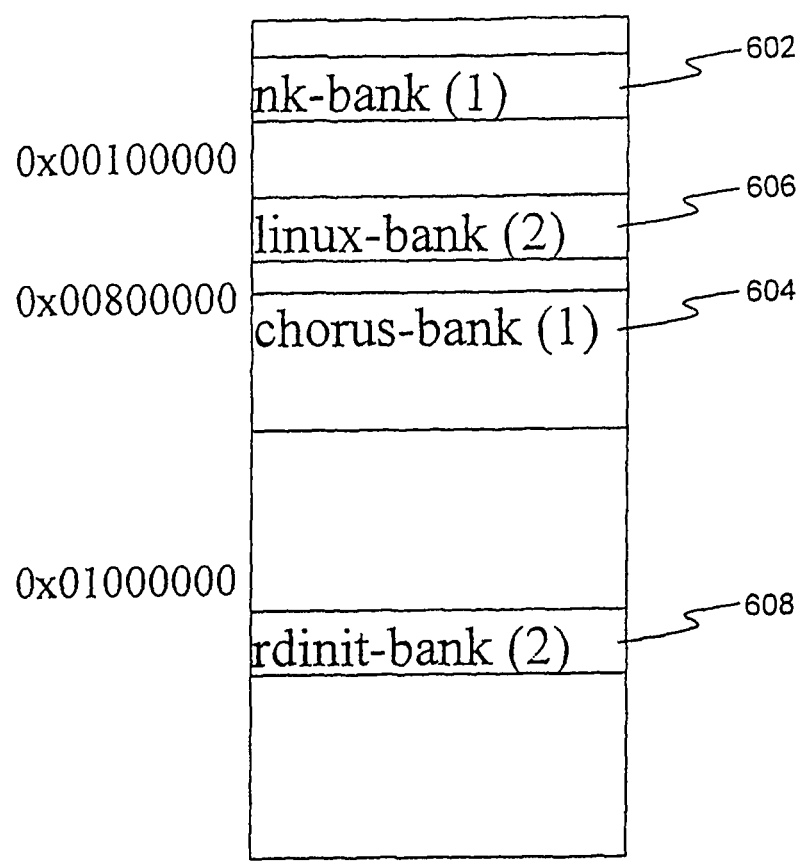
FIG. 6 illustrates the system memory image used in the boot or initialisation process.

FIG. 6 illustrates an example of a memory address allocation forming the system image. A position within memory is allocated when the hardware resource dispatcher and operating systems are compiled. The set of these positions in memory defines the system image, shown in FIG. 6. The system image comprises a first bank of memory 602 where the hardware resource dispatcher is located; a second bank of memory 604 where the real time operating system is located; a third bank of memory 606 where the secondary operating system is located; and, in this embodiment, a fourth bank of memory 608 where the RAM disk containing a root file system of the secondary operating system (Linux) is located.

This system image is stored in persistent storage (e.g. read only memory for a typical real time device such as a mobile telephone or PBX). The remaining banks of memory are available to be allocated to each operating system as its environment, within which it can load and run applications.

Allocation of Memory for Operating System Context

Whilst being booted, each operating system then allocates a complementary piece of memory in order to meet the total size required by its own configuration. Once allocated to an operating system, banks of memory are managed using the physical memory management scheme of the operating system itself. All other memory is ignored by the operating system.

Virtual Memory Allocation

Figure 3:
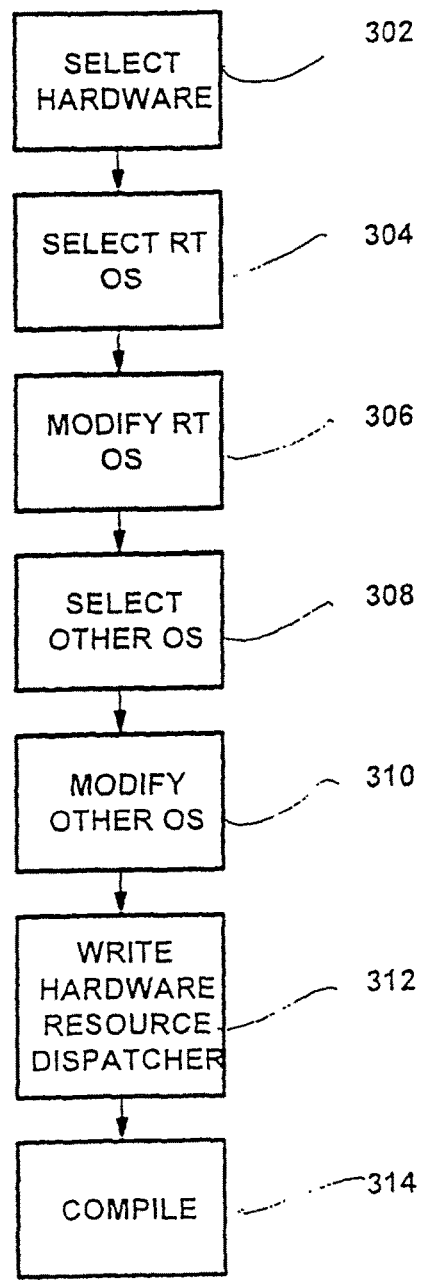
FIG. 3 is a flow diagram showing the stages in creating the software of FIG. 2b for the computer of FIG. 1.

Each operating system is allocated separate virtual memory spaces, to make sure that operating systems cannot interfere with each other or with the hardware resource dispatcher. The User address spaces (i.e. ranges) and Supervisor address space (i.e. range) of each of the operating systems is each allocated a different memory management unit (MMU) context identifier (ID), which allow the differentiation of different virtual memory spaces having overlapping addresses. The MMUs context IDs are assigned to each operating system at the time it is compiled (step 314 of FIG. 3).

This solution avoids the need to flush translation cashes (TLBs) when the hardware resource dispatcher switches between different operating systems, which would take additional time. Instead, the switch over between different operating systems is accomplished by storing the MMU context IDs of the currently function operating system, and recalling the previously stored MMU context IDs of the switched two operating system.

Allocation of Input/Output Devices

As indicated above, the allocation table 404 indicates which devices are allocated uniquely to each operating system. In addition, table 404 indicates which input/output resources (Direct Memory Access (DMA) devices, input/output ports, interrupts and so on) are allocated exclusively to such devices, thus allowing a direct use of these resources without any conflict. Typically, many devices are duplicated, so it is possible to reduce potential conflicts substantially in this way.

The distribution is based on the operating system configuration scheme (for example, in the case of C5, the devices specified in the device tree). They are allocated to operating systems at boot time, and in order of booting, so that the critical operating system has first choice of the available devices in the table 404 and the secondary operating systems in turn receive their allocation in what remains. As each operating system initialises, it detects the presence of these devices and uses its native drivers for them without interaction from the hardware resource dispatcher.

"Hot" Reboot of Secondary Operating System

According to the present embodiments, it is possible to reboot a secondary operating system (for example because of a crash) whilst other operating systems continue to run. Because of the separation of system resources, a crash in the secondary operating system does not interfere with the ongoing operation of the critical operating system (or other secondary operating systems) and the rebooting of that secondary operating system does not do so either.

In the embodiment, the system "stop" and "start" trap calls to the hardware resource dispatcher assist in shutting down and restarting the secondary operating systems from within the critical operating system. Additionally, the hardware resource dispatcher saves a copy of the original system image, at boot time, in persistent memory within the hardware resource dispatcher allocated memory. As an example, hot restart in this embodiment is managed as follows:

At the time of initially booting up, the hardware resource dispatcher saves a copy of the secondary operating systems memory image.

The critical operating system includes a software watchdog driver routine for periodically monitoring the functioning of the secondary operating systems (for example, by setting a timeout and waiting for an event triggered by a peer driver running in the secondary operating systems so as to check for their continued operation).

If the critical operating system detects that the secondary operating system has failed or stopped, it triggers "stop" and then "start" trap calls (of the secondary operating system) to the hardware resource dispatcher.

The hardware resource dispatcher then restores the saved copy of the secondary operating system image, and reboots it from memory to restart. It was found that, on tests of an embodiment, the Linux secondary operating system could be rebooted within a few seconds from locking up.

In other respects, the hot restart builds upon that available in the Chorus operating system, as described for example in:

"Fast Error Recovery in CHORUS/OS. The Hot-Restart Technology". Abrossimov, F. Hermann. J. C. Hugly, et al, Chorus Systems Inc. Technical Report, August 1996, 14 p. available from:

http://www.jaluna.com/developer/papers/CSI-TR-96-34.pdf

Run-Time Operation

The operation of the embodiment after installation and booting will now be described in greater detail.

Having been booted and initialised, the real time operating system is running one or more applications 207 (for example a UDP/IP stack—UDP/IP stands for Universal Datagram Protocol/Internet Protocol) and the secondary operating system is running several applications 208*a*, 208*b* (for example a word processor and a spreadsheet). The real time operating system microkernel 201 and the secondary operating system kernel 202 communicate with the hardware resource dispatcher through the hardware resource dispatcher interface which comprises:

a data structure representing the operating system context (i.e. the set of state variables which need to be saved and restored in order to switch to the operating system), and the hardware repository;

the set of functions which execute in the operating system environment; and the set of trap call routines which execute in the hardware resource dispatcher environment.

If neither operating system requires processor time (for example, both have reached "wait" states) then the hardware resource dispatcher 400 switches to the critical operating system's idle thread, in which it waits an interrupt or event. Thus, interrupts can be processed immediately by the critical operating system's servicing routines, without needing to switch to the critical operating system first.

At some point, an interrupt or event will occur. For example, a packet may be received at a data port, causing an interrupt to allow it to be processed by the real time operating system executing the UDP/IP stack. Alternatively, a user may manipulate a keyboard or mouse, causing an interrupt to operate the GUI of the second operating system 202 for interaction with the word processing application 208. Alternatively, the system clock may indicate that a predetermined time has elapsed, and that an application should commence re-execution, or an operating system function should execute.

The critical operating system servicing routine then services the interrupt, as described below.

Interrupt and Event Handling

If not already in the critical operating system, the hardware resource dispatcher interrupt handler 412 calls the operating system switcher 408 to switch to the critical operating system, and then the interrupt handler routine 412 to call an interrupt service routine (ISR) in the critical operating system 201. If the interrupt is intended for the critical operating system, either because it is from a device uniquely assigned to the critical operating system or because it is from a shared device and has a certain predetermined value, the critical operating system ISR takes the action necessary to handle the interrupt. If not, control is passed back to the hardware resource dispatcher.

Critical to Secondary Operating Systems Switch

Figure 7:
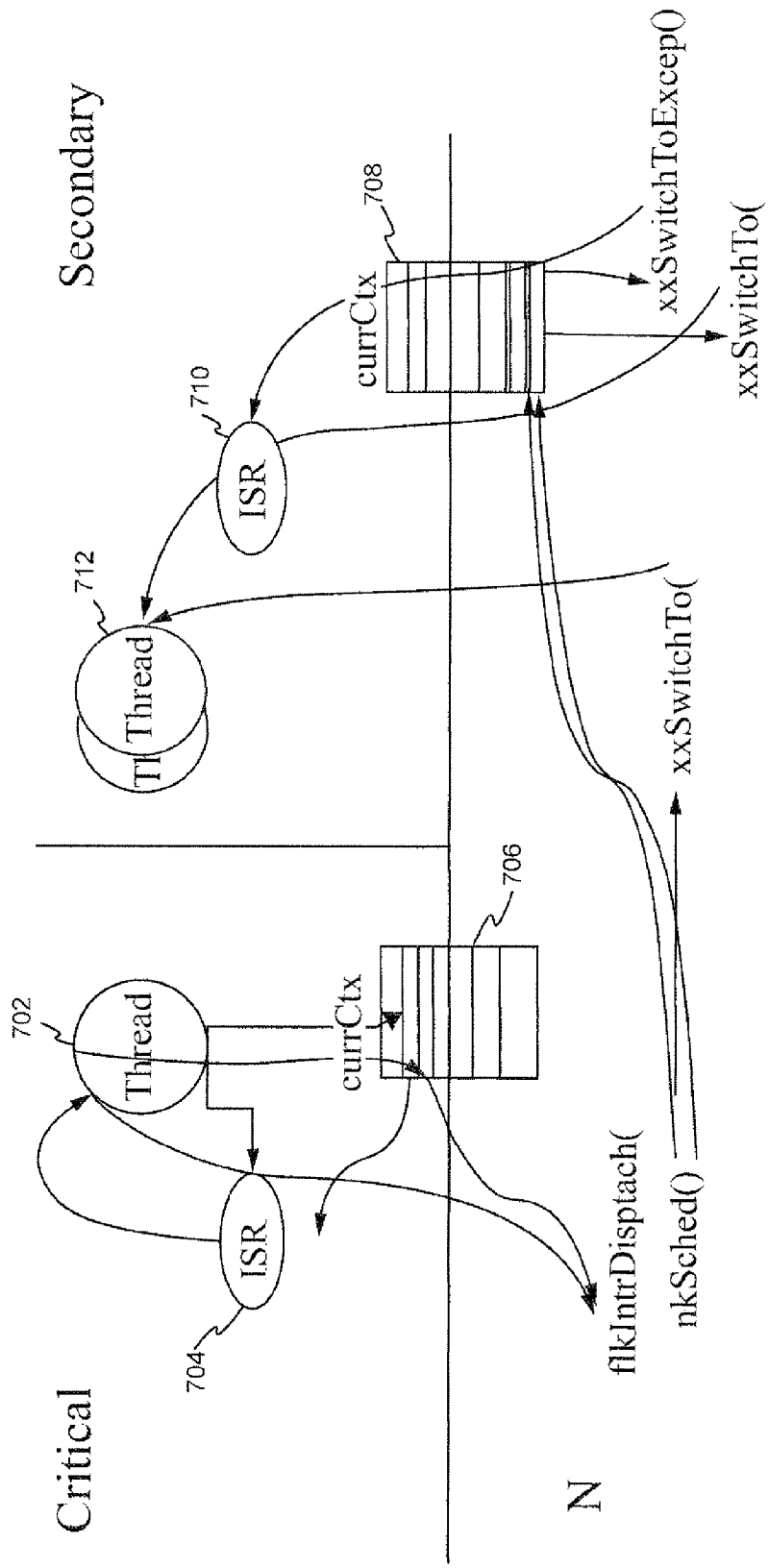
FIG. 7 illustrates the transition from a primary operating system to a secondary operating system.

Referring to FIG. 7, for this example, the system is executing a thread 702 of an application 207*a* running on the critical operating system 201.

If an interrupt occurs, a critical operating system interrupt service routine 704 performs interrupt servicing. On termination, control passes back to the thread 702 and any others executed by the scheduler of the critical operating system 201. When processing of all threads is complete, the critical operating system has finished executing, it schedules its "idle" thread. Accordingly the "idle" trap routine in the critical operating system issues an "idle" trap call to the hardware resource dispatcher 400. The hardware resource dispatcher then executes a routine which does the following:

If the interrupt handler 412 currently has some stored virtual interrupts, these are forwarded by the interrupt handler 412 to the secondary operating system.

The hardware resource dispatcher operating system scheduler 410 selects the secondary operating system 202 to execute. The OS switcher 408 then saves the current context (typically, processor MMU and status registers, instruction and stack pointers) in the critical OS context storage area 706. It then retrieves the stored execution context 708 for the secondary operating system 202, and writes them to the registers concerned.

If there are virtual interrupts for the secondary OS concerned, the interrupt handler 412 calls the relevant interrupt service routine 710 within the secondary operating system, which services the interrupt and then, on completion, reverts to the execution of a thread 712 of the secondary operating system where it left off.

If the interrupt handler 412 currently has no pending interrupts, then the hardware resource dispatcher operating switcher 408 causes the secondary operating system to recommence execution where it left off, using the stored program counter value within the restored operating system context, in this case at the thread 712.

Thus, after the critical operating system 201 has performed some function (either servicing its own applications or services, or servicing an interrupt intended for another operating system), the hardware resource dispatcher passes control back to the next secondary operating system 202, as determined by the scheduler 410.

Secondary to Critical Operating System Switch on Interrupt

Figure 8:
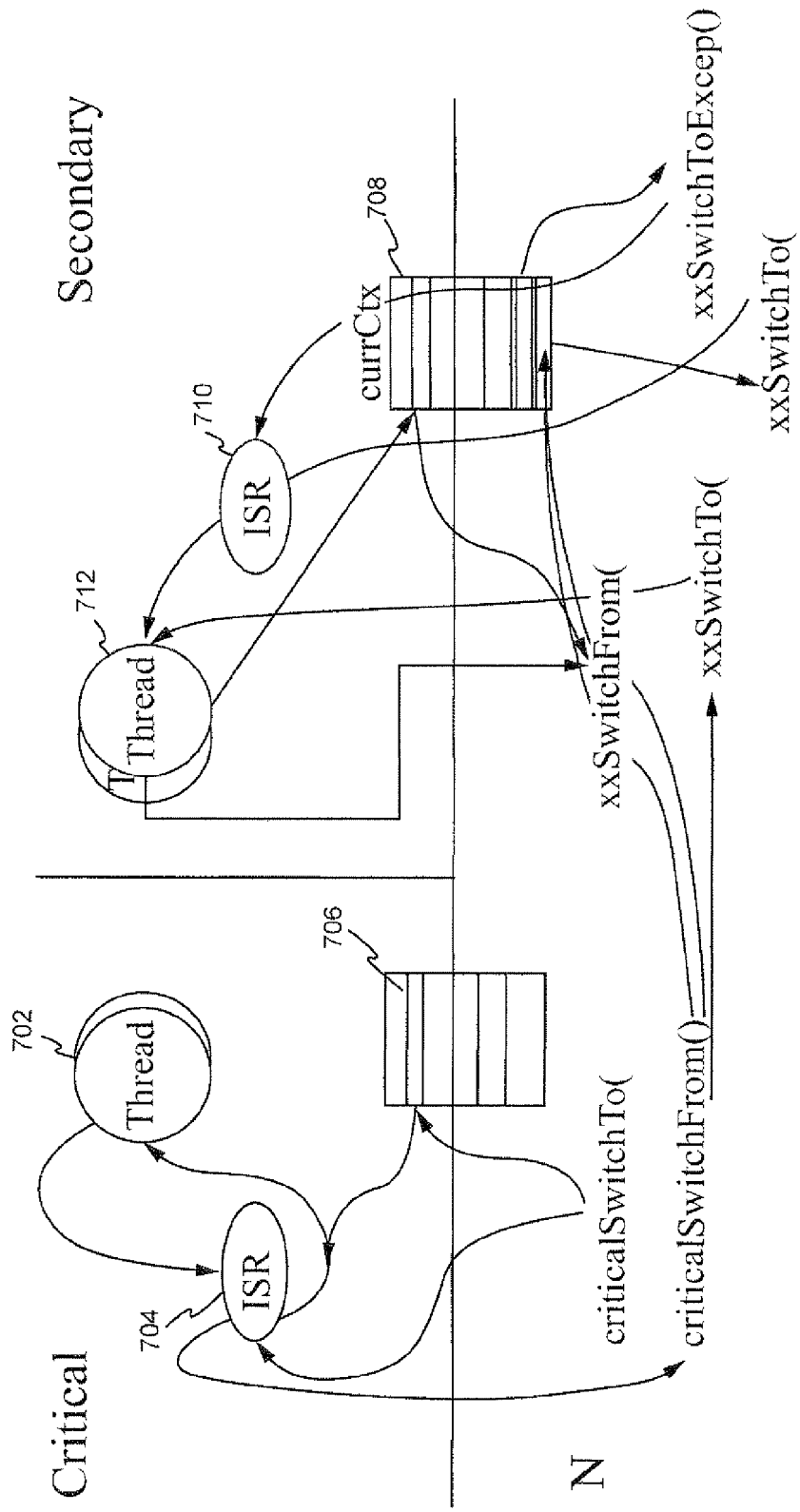
FIG. 8 illustrates the transition from a secondary operating system to a primary operating system.

Referring to FIG. 8, the process of transferring from the secondary operating system to the critical operating system will now be disclosed. In this case, the system is executing a thread 712 of an application 208*a* running on the critical operating system 202.

When a hardware interrupt occurs, the hardware resource dispatcher starts the OS switcher, to save the secondary operating system context in the context storage area 708. It then switches to the primary operating system 201, restoring the values of state variables from the context storage area 706, and calls the interrupt service routine 704 of the primary operating system 201. After servicing the interrupt, the scheduler of the primary operating system 201 may pass control back from the ISR 704 to any thread 704 which was previously executing (or thread to be executed).

When the ISR and all threads are processed, the primary operating system 201 passes control back to the hardware resource dispatcher, which switches from the primary operating system 201 (saving the state variables in the context storage 706) and switches to a selected secondary operating system 202 (retrieving the state variables from the context storage 708), in the manner discussed with reference to FIG. 7 above.

Inter-Operating System Communications—Virtual Bus 418

The virtual bus routine cooperates with the virtual bus drivers in each operating system. It emulates a physical bus connecting the operating systems, similar to Compact PCI (cPCI) boards plugged into a cPCI backplane. Each operating system is provided with a driver routine for the virtual bus bridge device on this virtual bus, allowing the operating systems and their applications to communicate by any desired protocol, from raw data transfer to a full IP protocol stack.

The hardware resource dispatcher virtual bus is based on shared memory and system cross interrupts principles already discussed above. In detail, the virtual bus routine 418 emulates the C5 buscom DDI: syscom which defines virtual bus bridge shared devices, allowing the export (sharing) of memory across the virtual bus and triggering of cross-interrupts into other operating systems.

Each virtual bus driver, in each secondary operating system, creates such a virtual bus bridge in the hardware resource dispatcher hardware repository at startup time. By doing so, it exports (shares) a region of its private memory, and provides a way to raise interrupts within its hosting system.

Thus, a virtual bus driver of a first operating system sends data to a second operating system by:
writing into the memory exported by a peer virtual bus driver of the second operating system, and then;
triggering a cross-interrupt to notify that data are available to the peer bus driver in the second operating system.

In the reverse (incoming) direction, the virtual bus driver propagates incoming data up-stream (for use by the application or routine for which it is intended) when receiving a cross-interrupt indicating that such data have been stored in its own exported memory region.

Figure 9A:
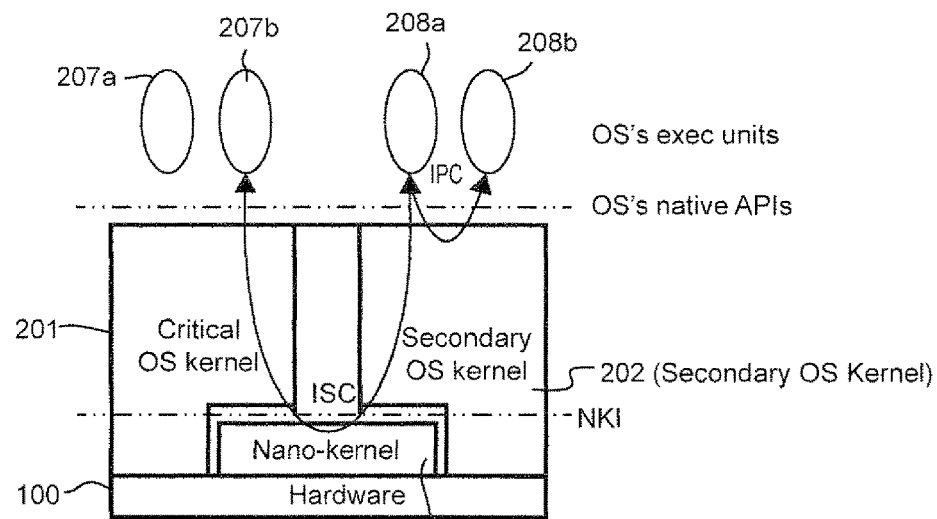
FIG. 9a illustrates the communication between applications running on different operating systems according to the invention.

Referring to FIG. 9a, an application 208a which is to communicate with another 208b running on the same operating system 202 can do so through that operating system. An application 207b running on one operating system 201 which is to communicate with another 208b running on a different operating system 202 does so by writing data to the virtual bus using the API of its operating system, which uses the virtual bus driver routine to pass the data to the other operating system 202, which propagates it from its virtual bus driver to the application 208b.

Figure 9B:
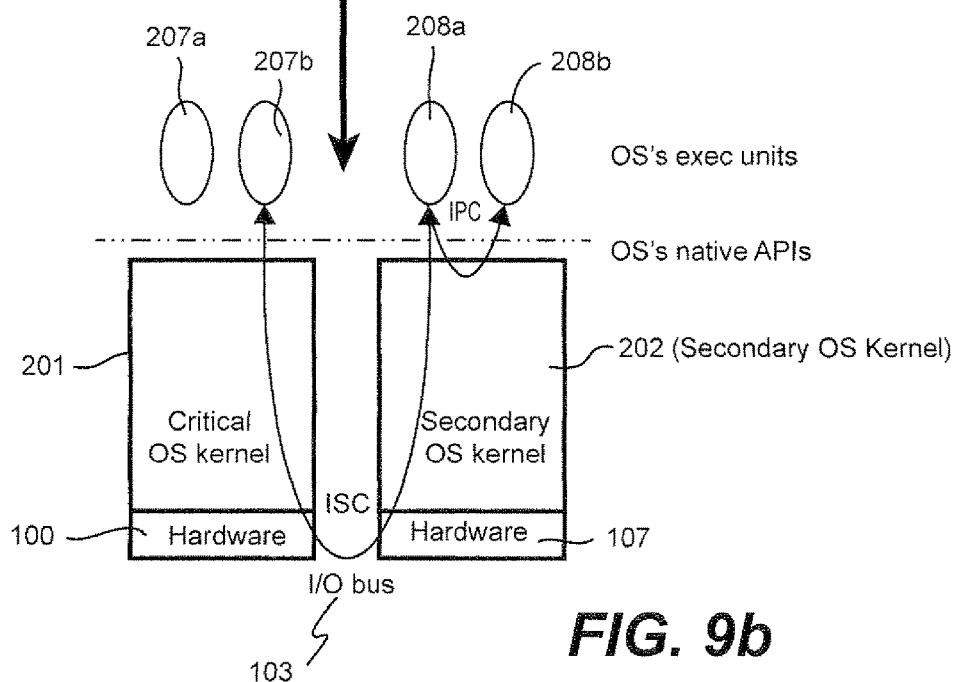
FIG. 9b illustrates the communication between applications running on different operating systems on different computers according to the invention.

Referring to FIG. 9b, the changes necessary to migrate this arrangement to one in which the first and second operating systems run on different computers 100 are small; it is merely necessary to change the drivers used by the operating systems, so that they use drivers for a real bus 103 rather than the virtual bus drivers. The system is therefore made more independent of the hardware on which it operates.

Communication across the hardware resource dispatcher virtual bus is available to applications, but can also be used internally by the operating system kernels, so that they can cooperate in the implementation of services distributed among multiple operating systems. "Smart" distributed services of this kind include software watchdog used for system hot restart (discussed above), or a distributed network protocol stack.

EP 1054332 patent uses a semaphore lock to synchronize access to the common communication memory. Such a lock introduces an extra dependence between the RT and GP operating systems. In the present embodiments, this is avoided using a lockless communication protocol.

Debugging

In a preferred embodiment, the hardware resource dispatcher has a second mode of operation, in which it acts as a debugging agent.

According to this embodiment, in the second mode, the hardware resource dispatcher can communicate via a serial communications line with debugging software tools running on another machine (the "host" machine).

Such debugging tools provide a high level graphical user interface (GUI) to remotely control the hardware resource dispatcher. The hardware resource dispatcher virtualised exception mechanism is used to intercept defined exceptions. The user can then configure and control how the hardware resource dispatcher behaves in case of processor exceptions, and also display machine and system states, to enable diagnosis of code or other system errors or problems.

The user can select one or more such processor exceptions as the basis for a trap call from an operating system to the hardware resource dispatcher. On the basis of the selected exception, when the or each exception occurs during execution, the operating system is stopped, and executes the trap call to the hardware resource dispatcher, which then saves the current context and enables interaction with the debugging tools on the host. The user can then cause the display of the current states of the state variables (such as the stack pointers, program and address counters) and/or the content of selected block of memory. The user can specify either that a given type of exception should be trapped in a specific operating system to be debugged, or that they should be trapped whenever they occur, in any operating system. In response, the trap call is implemented in just one, or in all, operating systems. The user can also specify if a given type of exception is to be normally forwarded to the system when restarting execution or simply ignored.

Because the hardware resource dispatcher executes in its own environment, it is able to debug much more of an operating system than could be done from within that system. Importantly, no code is shared between the hardware resource dispatcher acting as a debug agent and the systems being debugged. This allows, for example, the debugging of even kernel low level code such as exception vectors or interrupt service routines.

Some other aspects of the overall (host/target) debugging architecture according to this embodiment are similar to those for the Chorus and C5 debugging systems, described in the document "C5 1.0 Debugging Guide" published by Jaluna, and available at:
http://www.jaluna.com/doc/c5/html/DebugGuide/book1.html Secure Architecture It will be clear that the embodiments described above give a firm basis for a secure architecture. This is because the secondary operating system, on which a user will typically run insecure applications, is insulated from specified system resources, and accesses them only through the hardware resource dispatcher (and the drivers of the primary operating system). Thus, security applications can be run on the primary operating system which, for example, perform encryption/decryption; allow access to encrypted files; manage, store and supply passwords and other access information; manage and log access and reproduction of copyright material. Applications running on the secondary operating system cannot access system resources which are not allocated to that operating system, and where the operating systems run in different memory contexts (i.e. use different addressing pointers to different spaces) applications running on the secondary operating system cannot be used to interfere with those operating on the primary system so as to weaken the security of its operations.

There now follows a description of a particularly preferred embodiment.

1 Introduction

This document describes the Jaluna nanokernel environment on ARM architecture. General principals of the Jaluna nanokernel design are already described in our earlier document *Jaluna-2: A Multi-System Programming Environment* (JL/TR-02-80.0.3). This document rather focuses on ARM specific aspects of the nanokernel implementation, in particular, on the nanokernel executive which is the corner stone of the nanokernel environment.

This document describes how the ARM processor architecture is used in order to implement the nanokernel executive which is capable to run multiple independent operating systems concurrently sharing the central processor unit (CPU) as well as the memory management unit (MMU) across these operating systems.

The document also describes how the nanokernel executive handles the hardware interrupts. In particular, it describes the mechanism used to intercept and forward hardware interrupts toward the primary operating system and the software interrupts mechanism provided to the secondary operating systems.

Note that in this document we assume that the nanokernel is running on a uniprocessor computer and therefore aspects related to the symmetrical multi-processor (SMP) architecture is not addressed here.

2 Overview 2.1 Virtual Address Spaces

If the MMU is present on a given implementation of the ARM architecture all operating systems and the nanokernel always run in a virtual address space, in other words, the MMU is always enabled. Note the memory context in which the nanokernel code is executing may vary in time. On the other hand the MMU is not required by the nanokernel, it also supports ARM processors without the MMU. In this case all operating systems and the nanokernel run in a physical address space.

In this description the memory context term designates a hardware address translation tree which root directory table is specified by the translation table base register in the system control coprocessor (CP15).

Typically, an operating system supporting user mode protection creates multiple memory contexts (one per user process) in order to be able to handle private user virtual address spaces. The kernel changes the memory context each time it switches from one user process to another. On the other hand, together with the user address spaces, the operating system kernel also handles the unique supervisor address space replicated in all memory contexts. User and supervisor virtual addresses never overlap on ARM architecture.

If no MMU is present an operating system shares the same address space among all processes, so no memory context switch is needed. In this case we can say the operating system uses only one memory context for the supervisor space.

The supervisor address space mappings may be either static or dynamic. The static mapping is created at system initialization time and it typically maps (entirely or partially) available physical memory. Such mapping also called the one-to-one or kernel virtual (KV) mapping. In particular, the KV mapping usually covers the operating system kernel code, data and bss sections. Dynamic mappings are created at run time in order to access dynamically loaded kernel modules or dynamically allocated (non contiguous) memory chunks.

Naturally the memory context (the translation table base register) should be switched when the nanokernel schedules a new operating system to run on the CPU. The ARM architecture supports only virtual caches, so to avoid the very costly cache flushes at the memory context switch time, which can be necessary because of cache aliasing, we decided to require all KV mappings use the same translation formula. In other words a supervisor address of a physical memory location shall be same in all KV mappings for all operating systems. It shall use the same access and cache attributes. One can say all operating systems share the same supervisor address space (but not the translation tree, which could be different). Each operating system runs in a dedicated slot in this supervisor space. Note the described requirement is also very natural when no MMU is present.

Three kinds of memory contexts are distinguished in the nanokernel environment: primary, secondary and nanokernel contexts.

The primary memory context is a memory context currently used by the primary operating system kernel. Note that, in case the primary operating system supports user address spaces, there might be multiple memory contexts used by the primary kernel but, as was already mentioned above, the supervisor address space is identical in all such contexts. Because the nanokernel does not care about user space mappings, the primary memory context is unique from the nanokernel perspective and it consists of static and dynamic supervisor mappings established by the primary kernel.

The secondary memory context is a memory context currently used by a secondary operating system kernel. It is similar to the primary memory context. It is unique from the nanokernel perspective (for a given secondary kernel) and it consist of static and dynamic supervisor mappings established by a secondary kernel.

We require all operating systems map physical memory owned by the nanokernel, so they can invoke the nanokernel directly (i.e. without traps or other special instructions changing execution mode and memory context, see section 2.2). This way they also can access the data structures exported by the nanokernel (operating systems contexts, see section 2.3).

Every operating systems shall be able to map some physical memory owned by other operating systems upon the corresponding request from the communication mechanism implementation.

The nanokernel memory context is build by the nanokernel itself. This context maps all memory banks owned by all operating systems as well as the combined system image. It is used mostly on the nanokernel initialization phase.

Recall that all considered memory contexts shall use the same translation formula.

FIG. 1 shows an example of the primary, secondary and nanokernel memory contexts. In this example the physical memory size is 128 megabytes. All operating system and the nanokernel use a shifted one-to-one (KV) mapping starting from 0xc0000000 (like Linux kernel).

2.2 Nanokernel Invocation and Preemption

The nanokernel is invoked either explicitly through a function call or implicitly through an interrupt/exception handler. In the former case, we say that an operating system kernel invokes the nanokernel. In the latter case, we say that the nanokernel preempts an operating system. It is important to underline that the nanokernel is always invoked from the privileged operating system code running in the supervisor address space. On the other hand, the nanokernel may preempt the operating system kernel itself as well as an user process running under kernel control.

Once the combined system image is booted, the nanokernel is activated first and it starts execution of the primary and secondary operating system kernels. Once the initialization phase is done, the nanokernel plays a passive role. This means that the code executed in the nanokernel is driven by the primary and secondary kernels explicitly invoking the nanokernel or by externally generated synchronous (i.e., exceptions) and asynchronous (i.e., interrupts) events.

On ARM architecture, mechanisms used for the nanokernel invocation is almost same from the primary and the secondary operation systems. It is indirect function call in both cases. On the other hand the nanokernel preempts the primary and secondary operating systems in the different way.

In terms of execution environment, the nanokernel is quite closed to the primary operating system kernel. It often uses the same memory context and, sometimes, the same supervisor stack. Thus, the nanokernel has roughly the same availability as the primary operating system. On the other hand, there is a barrier between the secondary operating systems and nanokernel providing some protections against the secondary kernel malfunction. Note however that such a protection is not absolute and a secondary kernel is still able to crash the primary kernel as well as the nanokernel.

2.2.1 Primary Invocation

The primary operating system kernel invokes the nanokernel by a simple indirect call. The memory context is not switched by this invocation.

2.2.2 Primary Preemption

Actually the current implementation of the nanokernel on ARM architecture never preempts the primary operating system. The primary operating system preemption could be used to implement a lazy policy for FPU sharing between operating systems.

2.2.3 Secondary Invocation

A secondary operating system kernel invokes the nanokernel by a simple indirect call. The nanokernel itself switches the memory context and the execution stack if necessary.

2.2.4 Secondary Preemption

In order to be able to preempt the secondary operating system the nanokernel installs its own low level handlers in the processor exception table. When a secondary operating system is preempted by an interrupt these low level handlers jumps to the nanokernel code. Note that the memory context still unchanged until explicit switch performed when the nanokernel schedules another operating system to run on the CPU.

2.3 Operating System Context

The nanokernel data can be split on two categories: the global and per operating system data. The global data keeps the global nanokernel state (e.g., the nanokernel translation tree) while the per operating system data keeps a state associated to a given primary or secondary operating system kernel. The per operating system data is also called the operating system context.

Actually the nanokernel maintains two data structures per operating system. The first data structure is the operating system context itself. It is public, visible from any operating system and takes a part in the nanokernel interface. All operating system contexts are placed in the dedicated memory bank owned by the nanokernel. The operating system context is described in detail in further sections related to the nanokernel interface.

The second data structure is prived for the nanokernel. It contains per operating system information used internally by the nanokernel executive.

3 Nanokernel Executive Interface

This chapter describes the nanokernel executive interface exported to the primary and secondary operating system kernels. Such an interface consists in a data shared between an kernel and the nanokernel (i.e., visible operating system context) as well as the nanokernel methods. Note that the nanokernel interface is operating system role specific and is (strictly saying) different for the primary and secondary kernels. On the other hand, there is a quite significant intersection between these two interfaces which can be described independently from the operating system role.

3.1 Operating System Context

Figure 2B:
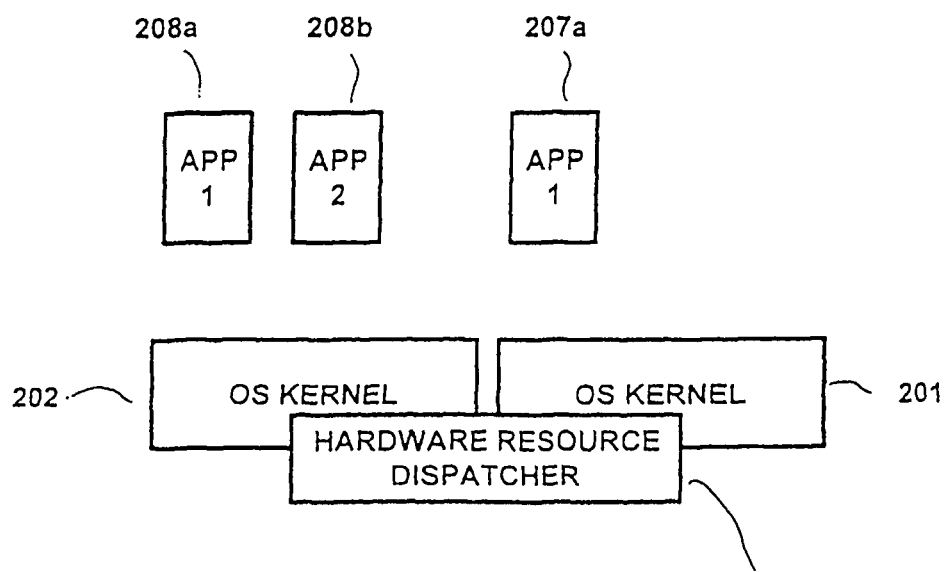
FIG. 2b is the corresponding diagram illustrating the arrangement of software according to the present embodiment.

FIG. 2 illustrates the operating system context.

All operating system contexts (primary as well as secondaries) are fixed length and put in a table indexed by operating system id. Note that, in the operating system context, all external references are made through physical addresses. An operating system has to convert such as physical address to the virtual one (from the KV mapping) in order to access the referenced data structure. The picture shows a configuration with only two kernels: primary and secondary.

The pending VEX and enabled VEX fields reflect the current state of the virtual exceptions (VEX). The virtualized exceptions mechanism is described in detail further in this document together with the secondary operating system kernel execution model.

The tags field is so called tag list. It contains boot information and given by a bootloader. Note the tag list in the nanokernel environment is virtualized and replicated in all operating system contexts. Among other tags, the tag list structure contains the boot command line specifying the boot time parameters. Such parameters are ether given by the boot loader or passed through the nanokernel environment variable. The command line is operating system specific. The nanokernel parses the initial command line in order to create operating systems specific command lines containing only parameters related to them.

The RAM info field points to the RAM description table. The RAM description table is a global data structure shared by all operating system kernels. It describes how the RAM resource is distributed among them.

The dev info field points to the list of devices descriptors presented on the target board. It is created and managed by the primary operating system. It describes how devices are distributed among operating systems (device cannot be shared by different operating systems). The secondary operating systems uses this list to register a shutdown function, which could be called during secondary operating system restart.

The VIL field is the FIFO list of pending hardware interrupts. Each entry contains an interrupt id—small integer number. Usually ARM based boards use huge number of different interrupts sources (often >64). So it was decided to represent set of pending interrupts as a list and not as bitmask. Actually this field is never used by the nanokernel itself. It is put here to simplify interrupt management code in the primary and secondary operating systems. The nanokernel uses only interrupt VEX bit in the pending VEX and enabled VEX fields for interrupt management purposes.

The pending XIRQ field is a reference to a table of the pending cross interrupts. This table is indexed by the operating system id. Each entry correspond to 32 possible cross interrupts per operating system. This table is not used by the nanokernel itself. It is referenced by the context structure in order to assist to the primary and secondary operating systems in the cross interrupts exchange. There is only one virtual exception dedicated to the cross interrupt delivery—cross interrupt VEX. The pending XIRQ table allows to extend the number of cross interrupts up to 32 (one bit per cross interrupt source). A cross interrupt bit is set by the source operating system (i.e., the operating system kernel which sends the cross interrupt) and it is reset by the destination operating system (i.e., the operating system kernel which receives the cross interrupt).

The ID field contains a unique operating system identifier. This field is read only. Identifier 0 is assigned to the nanokernel itself and identifier 1 is assigned to the primary operating system kernel. The operating system identifier designates the operating system in the nanokernel interface. For example, the operating system identifier is used to tag resources assigned to a given kernel (e.g., memory chunks in the RAM description table).

The last part of the operating system context specifies addresses of the nanokernel interface methods. They are addresses in the KV mappings, so they can be used to call nanokernel without any additional conversions. Recall that all KV mappings shall use the same address translation formula.

Note that the nanokernel exports different functions for the primary and secondary operating systems. For example when the primary operating and secondary systems invoke the idle method, they actually call two different nanokernel functions.

3.2 Nanokernel Methods

The nanokernel provides two groups of methods: the console I/O operations and the executive operations. The console I/O group allows a kernel to send/receive characters to/from the nanokernel console serial line. This document does not specially address the console I/O methods which are more or less generic but rather it is focused on the executive methods which are ARM architecture specific.

3.2.1 Install Exception Handler

On ARM architecture the exception table is unique and placed at address 0x00000000 or at address 0xffff0000. In the nanokernel environment this exception table is virtualized, so an operating system instead of installing exception vector directly into ARM exception table shall invoke this nanokernel method. The exception number (i.e. undefined instruction, prefetch abort, data abort or software interrupt) as well as exception handler address are passed as parameters.

The exception handler address is stored in the operating system context. The nanokernel can later use it to directly raise corresponding exception to the operating system with the minimum overhead of an additional indirect call.

On ARM architecture the exception table does not contain addresses of exception handlers but rather contain one processor instruction per exception. This instruction is used to jump to an actual exception handler. In the nanokernel environment we jump to a very small prologue code provided by the nanokernel itself. It reads an exception handler address from the current operating system context and jumps to it. The current operating context pointer is keeped in the global variable easily accessible by prologue code. The nanokernel updates this variable each time when a new operating system kernel is scheduled to execute on the CPU.

This way the exception handler is called in the same execution environment as in the native case: (execution mode and register contents). Note the banked stack pointer register is scratched by the nanokernel prologue code for undefined instruction, prefetch abort and data abort handlers. The banked stack pointer register for the software interrupt handler is keeped intact.

3.2.2 Install Interrupt Handler

This nanokernel method is used to install direct and indirect interrupt VEX handlers. Their addresses are passed as parameters.

The direct interrupt handlers are similar to the exception handlers. They are used only by the primary operating system to handle hardware interrupts while it is running on the CPU. The direct interrupt handlers are called in the same execution environment as in the native case: (execution mode and register contents).

The indirect interrupt handlers are invoked by the nanokernel to handle interrupts forwarded by other operating system kernel. They are called in a slightly different execution environment as compared to the direct interrupt handlers. They are discussed in details further in this document.

3.2.3 Install Cross Interrupt Handler

The nanokernel supports an additional virtual exception which does not exist on the real CPU. It is a cross interrupt VEX. It is a corner stone of inter operating system communication. The cross interrupt is very similar to a normal interrupt, but it is raised by an operating system instead of an hardware device.

This nanokernel method is used to memorise the corresponding cross interrupt handler. It will be called in the same execution environment (execution mode and register contents) as an indirect interrupt handler.

3.2.4 Post Cross Interrupt

This nanokernel method is used to raise a cross interrupt VEX on a destination operating system. It also sets a corresponding bit in the pending XIRQ table. The destination operating system id and cross interrupt number are passed as parameters.

3.2.5 Idle

The nanokernel provides an idle method which has to be called by an operating system kernel within an idle loop. It informs the nanokernel that the calling operating system kernel has nothing to do until the next interrupt.

The idle method invocation results in a system switch to the next ready to run secondary operating kernel (if any) or in the return from the primary idle method when all secondary operating system kernels are idle.

The nanokernel provides two different implementations for the primary idle method: stateless and statefull. When returning from the stateless idle method all registers are scratch. When returning from the statefull idle method the permanent registers {r4-r13} are preserved.

The right implementation of the idle method depends on the primary operating system idle loop implementation and can be chosen in the corresponding configuration .xml file.

3.2.6 Restart

The nanokernel provides a restart method which can be called by the primary as well as by a secondary operating system in order to restart a secondary operating system kernel. The id of the operating system being restarted is passed as a parameter.

The nanokernel stops the destination operation system execution, restores the operating system kernel image from its copy and finally starts the operating system kernel execution at the initial entry point.

3.2.7 Secondary Stop

The stop method is provided by the nanokernel to a secondary operating system. The nanokernel puts the caller operating into a non running state in order to avoid it being switched in by the nanokernel scheduler.

A stopped operating system can be started again by the restart nanokernel method described above.

4 Primary Execution Environment

Basically, the primary operating system kernel is executing in the native execution environment. The nanokernel implementation on ARM processor tries to minimize impact of the nanokernel environment to the primary operating system characteristics (performance interrupt latency, preemption latency). Because the primary operating system is typically a real-time operating system, it is important to keep the primary kernel behavior unchanged even if other (secondary) operating systems are running concurrently on the same processor.

4.1 Initialization

The primary operating system provides a small trampoline program which performs power up processor initialisation, installs (if necessary) the nanokernel data in the RAM. prepares an initial translation tree, enables MMU (if it is present) and jumps to the nanokernel entry point. The initial translation tree shall map the trampoline program and the nanokernel. The execution mode is the supervisor mode, all hardware interrupts are disabled.

The nanokernel in its turn installs the operating systems memory banks in the RAM, initialize operating system contexts and jumps to the primary entry point with enabled MMU (if it is present) and disabled hardware interrupts. The execution mode is still the supervisor mode.

The nanokernel initialization code is executed using a static nanokernel stack located in its data section. When jumping to the primary operating system kernel, this stack is still valid. Despite of that, the primary operating system kernel should switch to its own stack as soon as possible and should never use this nanokernel stack in the future. The nanokernel stack is used not only at initialization phase but also at run time in order to handle secondary invocations and preemptions as described in the next chapter.

When jumping to the primary operating system kernel, the supervisor mode banked stackpointer register points to the primary operating system context. Processor interrupts are disabled at the beginning of the primary initialization phase. The primary operating system kernel usually enables interrupts once a critical initialization phase is done.

During the initialization phase, the primary operating system kernel typically invokes the nanokernel methods in order to setup exception and interrupt handlers. Finally the primary kernel enters in the idle loop and invokes the nanokernel idle method.

When the idle method is called first time, the nanokernel considers that the primary operating system kernel has fully initialized its execution environment and it proceeds to the post initialization phase.

In such a post initialization phase, the nanokernel completes the nanokernel memory context. Note that it is the primary operating system duty to discover and register all available physical memory in the corresponding descriptor pointed by RAM info field, so the nanokernel can be complete its memory context. Once the post initialization is done, the nanokernel calls the scheduler in order to either switch to a ready to run secondary kernel or return from the primary idle method if all secondary kernels are idle.

The nanokernel requires the primary operating system kernel to initialize the globally shared data structures: the RAM descriptor and the devices list. Such an initialization has to be done before the idle method is called. This requirement is natural because beyond this moment a secondary kernel can access the globally shared data structures.

In particular, the primary kernel is in charge to detect the physical memory available on the board and to register free physical memory chunks in the RAM descriptor.

According to the primary Board Support Package (BSP), the primary kernel should start nanokernel aware drivers in particular an interrupt controller driver.

4.2 Primary Exceptions

Basically, the nanokernel does not intercept exceptions which occur when the primary operating system is running on the processor. All programming exceptions are handled by native primary handlers. The nanokernel executes only a small prologue code to jump to the corresponding exception handler. The primary low-level handlers do not need to be modified when porting to the ARM nanokernel architecture.

Note the banked stack pointer register is scratched by the nanokernel prologue code for undefined instruction, prefetch abort and data abort handlers. The banked stack pointer register for the software interrupt handler is keeped intact.

4.3 Primary Interrupts

When an interrupts occurs while the primary operating system is running on the CPU, the native low level (direct) interrupt handler is invoked without any additional code introduced by the nanokernel. The banked stack pointer register is keeped intact.

4.4 Forwarded Interrupts

When an interrupt occurs while a secondary operating system is running on the processor, it is forwarded to the primary operating system. Such an interrupt forwarding process goes through the following major steps:

the interrupt is intercepted by the nanokernel;
execution of the preempted secondary operating system kernel is suspended and the nanokernel switches to the primary execution environment;
the nanokernel triggers the corresponding interrupt to the primary operating system kernel In such a way the corresponding primary low-level indirect interrupt handler is invoked (in the primary execution environment) in order to process the interrupt. Once the interrupt is processed, the primary operating system kernel returns to the nanokernel.

After returning from the primary indirect interrupt handler, the nanokernel calls its scheduler in order to determine the next secondary operating system to run. Note that the preempted secondary system would not necessary be continued after interrupt. Another (higher priority) secondary system may become ready to run because of the interrupt.

On ARM architecture the CPU can run in 7 different execution modes: user, system, supervisor, undefined, abort, interrupt and fast interrupt. 5 of them have their prived/banked r13 and r14 registers. So ideally when the nanokernel switches from one operating system kernel to another one all banked registers should be switched too. In order to speed up the operating system switch and interrupt forwarding we decided to consider all banked registers except supervisor ones as scratch, we also decided to always perform such a switch in the supervisor mode.

Note if an interrupt occurs while the secondary system runs in the user mode, the corresponding banked stack register will be preserved by the interrupt handler because it always preserves a previous state. If an interrupt occurs while the secondary systems runs in the supervisor mode, the user mode banked registers are already saved by the operating system itself.

Easiest way to satisfy our requirements is to modify the secondary operating system exception handlers. They should always set the banked stack pointer register to a predefined value and switch to the supervisor mode as soon as possible. The hardware interrupts should be enabled only when the switch to the supervisor mode is completed.

There are no restriction on the CPU execution mode while the primary operating system is running, because the operating system switch cannot occur in a such situation.

When nanokernel forwards an interrupt to the primary operating system kernel, it invokes a primary indirect interrupt handler. It is invoked in the supervisor mode with r10-r15 and cpsr registers already saved in the operating system context. r10 contains the pointer to this context. Note that by construction the primary operating system is always in the inactive state (i.e. it called the idle nanokernel method), when the nanokernel forwards an interrupt to it.

As result of an indirect interrupt handler execution the primary operating system can schedule a new task, so if it implements a stateless idle loop (if it does not require an interrupt handler preserves all registers when it is called in the idle state or simply switches to a new task without saving idle loop registers), the nanokernel should save all registers (and only r10-r15) in the operating system context. They will be restored when the nanokernel switches back to the secondary operating system.

If a primary operating system implements a statefull idle loop (for example if an idle loop is implemented as an ordinary lowest priority task and an operating system scheduler is called directly at the end of interrupt processing), we can defer r0-r9 register saving because they will be preserved by the primary operating system. The nanokernel need to save/restore them only when it schedule different secondary operating systems. If we run only two operating systems in the nanokernel environment (one primary and one secondary) r0-r9 register saving can be completely avoided.

The nanokernel supports both general (nonoptimised) interrupt forwarding (when all registers are saved prior to an indirect interrupt handler invocation) and optimised one. The right implementation depends on the primary operating system and can be chosen in the corresponding configuration .xml file.

5 Secondary Execution Environment

Basically, the secondary operating system kernel execution environment is quite closed to the native one except for the interrupts management. The nanokernel environment modifies the native mechanism of the interrupts management in order to make a secondary operating system fully preemptable by other operating systems. A secondary operating system kernel ported to the nanokernel architecture no more disables interrupts at processor level but rather uses a software interrupts mechanism provided by the nanokernel (i.e., virtual exceptions). Interrupts are no more directly processed by such a secondary operating system kernel, but rather they are intercepted by the nanokernel and forwarded to the primary operating system kernel. The primary operating system in its turn will raise if necessary an interrupt VEX for the secondary operating system. This interrupt VEX will be handled immediately by a secondary indirect interrupt handler if it is unmasked and deferred if it is masked.

5.1 Initialization

The nanokernel installs the secondary memory banks at initialization time together with primary banks. On the other hand, the final initialization of a secondary kernel is deferred until the post initialization phase.

At this phase, the nanokernel allocates memory to keep a copy of secondary memory banks. Such a copy is then used to restore the initial image of secondary system at restart time. The secondary system restart is however optional and it might be disabled in order to reduce the physical memory consumption.

Analogous to the primary kernel, the operating system context is passed in the supervisor mode banked stack-pointer register. On the other hand, unlike the primary kernel, the hardware interrupts are enabled even during the secondary kernel initialization phase. Obviously the corresponding secondary interrupt VEX'es are disabled. It should be noted that even the secondary kernel initialization code is fully preemptable by the primary system. This is particularly important in order to do not disturb the primary operating system when a secondary operating system is restarted.

Despite of enabled hardware interrupts, the virtual exceptions (corresponding to hardware interrupts) are disabled when a secondary kernel is started. So, interrupts are not delivered by the nanokernel until they are explicitly enabled by the kernel at the end of the critical initialization phase. The software interrupts masking mechanism (based on virtual exceptions) is described in detail further in this document.

The secondary operating system is started with MMU enabled. The nanokernel context is used as an initial memory context. Such an initial one-to-one mapping is temporarily provided to a secondary kernel. Note that this mapping should not be modified or permanently used by the initialization code, instead, the secondary kernel should build its own KV mapping and switch to it as soon as possible.

Usually, the secondary kernel uses a static initial stack located in the data section in order to execute its initialization code.

Analogous to the primary kernel, during the initialization phase, a secondary kernel typically invokes the nanokernel in order to install exception and interrupt handlers. Finally the secondary kernel enters in the idle loop and invokes the nanokernel idle trap.

5.2 Secondary Exceptions

Basically, the nanokernel does not intercept exceptions which occur when the secondary operating system is running on the processor. All programming exceptions are handled by native secondary exception handlers. The nanokernel executes only a small prologue code to jump to the corresponding exception handler. They secondary low-level handlers do not need to be modified when porting to the ARM nanokernel architecture.

Note the banked stack pointer register is scratched by the nanokernel prologue code for undefined instruction, prefetch abort and data abort handlers. The banked stack pointer register for the software interrupt handler is keeped intact.

5.3 Virtual Exceptions

Virtual exceptions (VEX) is a mechanism provided by the nanokernel which allows an operating system kernel to post an exception to an operating system kernel and to deliver it in a deferred manner. In particular, the VEX mechanism is used in the ARM nanokernel architecture in order to replace hardware interrupts with software ones for a secondary operating system kernel.

The VEX interface consists in two field located in the kernel context: pending and enabled. These fields are meaningful only for a secondary operating system context, but they are accessed by both the primary and secondary operating system kernels.

All virtual exceptions are naturally enumerated by the bit position in the pending (or enabled) field. So, there are in total 32 possible virtual exceptions on the ARM architecture (the pending and enabled fields are 32 bit integer values).

There are only 4 virtual exceptions supported by the nanokernel on ARM architecture: interrupt, fast interrupt, cross interrupt and "running".

The table below shows how the virtual exceptions are mapped to the real ones:

| Virtual Exception | Description |
| --- | --- |
| 0 | "running" |
| 8 | interrup VEX |
| 16 | fast interrupt VEX |
| 24 | cross interrupt VEX |

The virtual exception "running" does not correspond to any real exception and it is in fact a pseudo virtual exception which is used internally by the nanokernel is order to detect whether the kernel is idle. How such a pseudo virtual exception works is described in detail further in this document.

Because multiple virtual exceptions can be pending at the same time but only one of them can be processed at time, all virtual exceptions are prioritized according to its number. The highest priority is assigned to the fast interrupt VEX and the lowest priority is assigned to the "running" VEX.

The pending VEX field of a secondary context is typically updated by the primary kernel which provides a driver for the interrupt controller. Such a driver usually posts virtual exceptions to secondary kernels by setting appropriate bits in the pending VEX field.

The enabled VEX field is updated by the secondary kernel in order to enable or disable virtual exceptions. A given virtual exception is enabled if the corresponding bit is set in the enabled VEX field. Using the enabled VEX field, a secondary kernel implements critical sections protected against interrupts. In other words, a secondary kernel no more manipulates CPSR register to disable/enable processor interrupts but rather modifies the enabled VEX field of its kernel context.

A given virtual exception is delivered by the nanokernel if it is pending and enabled simultaneously. The nanokernel resets the corresponding pending bit just before jumping to the VEX handler.

Note that all VEX handlers are actually indirect handlers. They are invoked by the nanokernel in the supervisor mode with r10-r15 and cpsr registers already saved in the operating system context. r10 contains the pointer to this context.

When porting a secondary kernel on the ARM nanokernel architecture, low-level exception handlers have still to be modified in order to take into account the software interrupts masking mechanism which substitutes the hardware one. When calling an interrupt handler the nanokernel only disables all virtual exceptions writing the corresponding value to the enabled field. The hardware interrupts are always enabled at processor level when running a secondary operating system and therefore it can be preempted by the primary one even inside a low-level interrupt handler. In such a way, in the nanokernel environment, a secondary operating system becomes fully preemptable by the primary operating system.

A virtual exception can be posted by the primary operating system kernel while it is in disabled state. It this case, the exception is not delivered to the secondary operating system kernel but it is rather kept pending until the virtual exception is re-enabled again. So, when virtual exceptions are re-enabled by a secondary operating system kernel, a check should be made whether any virtual exceptions are pending. If the check is positive, the secondary operating system kernel should invoke the nanokernel in order to process such pending virtual exceptions.

In general, a secondary kernel re-enables virtual exceptions in two following cases:
- when virtual exceptions has been previously disabled by the secondary kernel in order to protect a critical section of code;
- when virtual exceptions has been disabled by the nanokernel as result of an indirect interrupt handler invocation.

5.4 Nanokernel Re-Entrance

The nanokernel code is mostly executed with interrupts disabled at processor level preventing re-entrance into the nanokernel. On the other hand, some nanokernel invocations may take a long time and therefore the nanokernel has to enable interrupts when executing such long operations in order to keep the primary interrupt latency low.

There are two kinds of long nanokernel operations:
- synchronous console output
  The operation duration depends on the serial line speed. For example, on a 9600 baud rate line, a single character output may take up to 1 millisecond.
- secondary kernel restart
  The operation duration depends on the kernel image size which is restored from a copy.

For all operations listed above, the nanokernel enables interrupts and therefore re-entrance from the primary kernel. On the other hand, while interrupts are enabled, the nanokernel scheduler is disabled in order to prevent another secondary kernel to be scheduled when returning from the primary interrupt handler. In other words, the nanokernel can be preempted by the primary kernel only (as result of an interrupt) but re-entrance from a secondary kernel is prohibited. Such a restriction allows the nanokernel to use global resources for the secondary execution environment.

Some long operations issued from a secondary kernel can be executed in the primary memory context. In other words, before executing such an operation, the nanokernel switches to the primary execution context and then enables interrupts. Once the operation is done, the nanokernel disables interrupts and returns to the caller secondary kernel through the nanokernel scheduler.

Note also that it is preferable to execute frequently used nanokernel methods in the nanokernel memory context (even if they can be executed in the primary memory context as well) in order to avoid an extra overhead introduced by the switch to/from the primary execution environment. A typical example of such a frequent operation is a synchronous output on the nanokernel console.

6 Scheduler

The main role of an operating system scheduler is to choose the next task to run. Because the nanokernel controls execution of operating systems, the nanokernel scheduler chooses the next secondary operating system to run. In other words, the nanokernel adds an extra scheduling level to the whole system.

Note that, in the nanokernel architecture, the primary operating system has a higher priority level with respect to secondary systems and the CPU is given to a secondary system only when the primary one is in the idle loop. We can say that the primary kernel is not preemptable and it explicitly invokes the nanokernel scheduler through the idle method called in the idle loop. Once an interrupt occurs when running a secondary system, the primary kernel interrupt handler is invoked. From the primary kernel perspective, such an interrupt preempts the background thread executing the idle loop. Once the interrupt is handled and all related tasks are done, the primary kernel returns to the nanokernel which invokes the nanokernel scheduler in order to determine the next secondary system to run. From the primary perspective, the kernel just returns to the background thread preempted by the interrupt. The secondary activity is transparent for the primary kernel and it does not change the primary system behavior.

The nanokernel may implement different scheduling policies. By default, however, a priority based algorithm is used. Note that, at the same priority level, the nanokernel uses a round-robin scheduling policy. Priority of a given secondary kernel is statically configured at system image build time.

Whatever the scheduling policy is implemented, the scheduler has to detect whether a given secondary system is ready to run. This condition is calculated as the bitwise logical and operation between the pending VEX and enabled VEX fields of the kernel context. A non zero result indicates that the system is ready to run.

As was described above, each bit in the pending VEX and enabled VEX pair represents a virtual exception. Rephrasing the ready to run criteria, we can say that a secondary system is in the ready to run state if there is at least one non masked pending virtual exception.

Among all virtual exceptions which are typically mapped to the hardware and software (cross) interrupts, there is a special virtual exception (running) reflecting whether the kernel is currently idle.

The running bit is cleared in the pending VEX field each time a secondary kernel invokes the idle method and the running bit is set in the pending VEX field each time a virtual exception is delivered to the secondary kernel.

The running bit is normally always set in the enabled VEX field for a running secondary kernel. The nanokernel sets this bit when a secondary kernel is started and it resets this bit when a secondary kernel is halted. The secondary kernel should never clear the running bit when masking/unmasking interrupts mapped to virtual exceptions.

Note that an external agent is able to suspend/resume execution of a secondary kernel by clearing/restoring the enabled VEX field in its kernel context. This feature opens possibilities for a scheduling policy agent to be implemented outside of the nanokernel, as a primary kernel task. In addition, this also enables a debug agent for a secondary kernel to be running as a task on top of the primary kernel. An advantage of such a secondary debug agent is that all services provided by the primary operating system become available for debugging (e.g. networking stack) and the secondary kernel debugging may be done concurrently with critical tasks running on the primary operating system.

7 Cross Interrupts

This section mostly consolidates information (already given in previous sections) related to the nanokernel cross interrupts mechanism.

Two following kinds of cross interrupts will be considered here:
  a cross interrupt sent to a secondary operating system kernel
  a cross interrupt sent to the primary operating system kernel In order to send a cross interrupt to a destination secondary operating system, a source operating system kernel first sets a bit corresponding in the cross interrupt table pointed by the pending XIRQ field of the operating system context. Then the source operating system kernel posts the cross interrupt VEX to the destination operating system setting the corresponding bit in the pending VEX field of the destination operating system context. Once the cross interrupt handler is called by the nanokernel, it checks the pending XIRQ fields clears bit corresponding to the pending cross interrupt source and finally invokes handlers attached to this source. Both source and destination operating system kernels uses atomic instructions to update the pending XIRQ field. Note that the same algorithm is used by both types of source operating system kernels: primary and secondary.

In order to send a cross interrupt to the primary operating system, a secondary operating system kernel first sets a bit corresponding to the cross interrupt table pointed by the pending XIRQ field of the operating system context. The nanokernel immediately preempts the secondary operating system and invokes the primary low-level cross interrupt handler which checks the pending XIRQ field, clears bit corresponding to the pending cross interrupt source and finally invokes handlers attached to this source.

The cross interrupt number zero must not be used by operating system kernels. This interrupt is reserved for the nanokernel to notify operating systems that a halted operating system has been started or a running operating system has been halted. In other words, the cross interrupt number zero notifies running operating systems that the global system configuration is changed. It is broad casted to all running operating systems each time the state of the running field is changed in an operating system context.

Other Aspects and Embodiments

It will be clear from the forgoing that the above-described embodiments are only examples, and that many other embodiments are possible. The operating systems, platforms and programming techniques mentioned may all be freely varied. Any other modifications, substitutions and variants which would be apparent to the skilled person are to be considered within the scope of the invention, whether or not covered by the claims which follow. For the avoidance of doubt, protection is sought for any and all novel subject matter and combinations thereof disclosed herein.

The invention claimed is:

1. A method of enabling at least two operating systems to run concurrently on the same computer, comprising:
  providing a common program arranged to switch between and control said at least two operating systems;
  providing each of the at least two operating systems with a dedicated virtual address range within a supervisor address space which is shared between the at least two operating systems;
  wherein each of the at least two operating systems use the same supervisor address space mapping of virtual to physical memory addresses in respect of at least part of an address space using same translation formula with different translation tree;
  wherein the method is implemented on a system comprising an ARM CPU;

wherein at least one of said at least two operating systems supports multiple memory contexts and each memory context being associated with a user process, wherein a kernel of said at least one operating system uses the supervisor address space replicated in all said multiple memory contexts.

2. The method of claim 1, wherein said at least two operating systems map physical memory associated with the common program, thereby enabling said at least two operating systems to invoke the common program directly.

3. The method of claim 1, wherein said at least two operating systems map physical memory associated with the common program, thereby enabling said at least two operating systems to access data exported by the common program.

4. The method of claim 1, wherein one of said at least two operating systems is enabled to map physical memory associated with another one of said at least two operating systems, and vice versa.

5. The method of claim 1, further comprising saving and restoring a subset of registers when switching from one operating system to another operating system.

6. The method of claim 1, further comprising operating all banked registers except the supervisor registers as scratch registers when the common program switches from one operating system kernel to another.

7. The method of claim 1, further comprising always switching between execution modes of the CPU in privileged mode, in particular supervisor mode.

8. The method of claim 1, wherein each of the at least two operating systems is enabled to initiate inter-operating system communications with another one of the at least two operating systems.

9. The method of claim 1, wherein the common program is arranged to provide an inter-operating system communications mechanism allowing communications between said at least two operating systems, and/or applications running on them.

10. The method of claim 1, wherein the common program defines virtual input and/or output devices corresponding to communications bus bridges, so that said at least two operating systems can communicate with one another as if by a communications bus.

11. The method of claim 10, wherein said at least two operating systems comprise driver routines managing said virtual bus bridge devices.

12. The method of claim 1, further comprising sharing of memory between said at least two operating systems, and communicating data between said at least two operating systems by storing said data in said shared memory.

13. The method of claim 12, wherein said at least two operating systems are enabled to generate inter-operating system cross-interrupts to one another, thereby to notify the availability of data in the shared memory.

14. The method of claim 12, wherein the cross-interrupts are delivered as virtual or software interrupts.

15. The method of claim 1, wherein one operating system sends data to another operating system by writing into memory exported by the another operating system, and triggering a cross-interrupt to notify that data is available to the other operating system.

16. The method of claim 15, wherein the another operating system propagates incoming data to the application or routine for which it is intended when receiving a cross-interrupt indicating that such data has been stored in its own exported memory region.

17. The method of claim 1, wherein a primary one of said at least two operating systems has a higher priority than a secondary one of said at least two operating systems.

18. The method of claim 17, wherein, if an interrupt occurs while the secondary operating system is running in user mode, the corresponding banked stack register is preserved by the common program.

19. The method of claim 17, wherein an exception handler of the secondary operating system is modified to set the banked stack pointer register to a predefined value.

20. The method of claim 1, wherein one of said at least two operating systems is a real time operating system.

21. The method of claim 1, wherein another one of said at least two operating systems is a non-real time, general-purpose operating system.

22. The method of claim 1, in which the common program is arranged to save, and to restore from a saved version, the processor state required to switch between the at least two operating systems.

23. The method of claim 1, in which, on occurrence of hardware interrupt during execution of an executing operating system,
  (a) the common program is arranged to call interrupt handling routines of a first one of the at least two operating systems to service them;
  (b) if the interrupt was intended for a predetermined second one of the at least two operating systems, an interrupt message is created;
  (c) after hardware interrupt has been serviced by the first operating system, the common program is arranged to return to execution of the executing operating system;
  (d) when the common program next switches to the predetermined second operating system, the hardware message which is pending is notified to the predetermined second operating system; and an interrupt handling routine of the predetermined second operating system corresponding to the said interrupt message is called to service it.

24. A computer system comprising an ARM CPU, memory devices and input/output devices, having executing thereon computer code comprising:
  at least two operating systems; and
  a common program arranged to run said operating systems concurrently by switching between and controlling said at least two operating systems;
  each of the at least two operating systems having a dedicated virtual address range within a supervisor address space which is shared between the at least two operating systems;
  each of the at least two operating systems using the same supervisor address space mapping of virtual to physical memory addresses in respect of at least part of an address space using same translation formula with different translation tree;
  wherein at least one of said at least two operating systems supports multiple memory contexts and each memory context being associated with a user process, wherein a kernel of said at least one operating system uses the supervisor address space replicated in all said multiple memory contexts.

* * * * *